(12) United States Patent  (10) Patent No.: US 9,176,502 B2
Furuno et al.  (45) Date of Patent: Nov. 3, 2015

(54) AUTOMATIC GUIDED VEHICLE AND METHOD FOR DRIVE CONTROL OF THE SAME

(75) Inventors: Hideaki Furuno, Tokyo (JP); Yoshiharu Tomioka, Tokyo (JP); Yutaka Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 563 days.

(21) Appl. No.: 13/223,544

(22) Filed: Sep. 1, 2011

(65) Prior Publication Data

US 2012/0059545 A1 Mar. 8, 2012

(30) Foreign Application Priority Data

Sep. 3, 2010 (JP) ................................. 2010-197865

(51) Int. Cl.
  *B25J 5/00* (2006.01)
  *B65G 1/00* (2006.01)
  *G05D 1/02* (2006.01)
(52) U.S. Cl.
  CPC .................................... *G05D 1/0234* (2013.01)
(58) Field of Classification Search
  CPC ............ B65F 9/00; B65G 67/20; B65G 1/04; B65G 1/00; B60L 15/2036; B66F 9/063; B65J 5/00; B61B 13/00; G05D 1/0225; G05D 1/0234; G05D 2201/0206; G05D 1/0238; G05D 1/02; G01C 3/00
  USPC ..................... 701/23, 24, 300, 301, 408, 533; 700/259
  See application file for complete search history.

(56) References Cited

U.S. PATENT DOCUMENTS

| 4,679,152 | A | * | 7/1987 | Perdue ............................ 701/23 |
| 4,918,607 | A | * | 4/1990 | Wible ............................. 701/23 |
| 4,944,357 | A | * | 7/1990 | Wible et al. .................... 180/169 |
| 5,341,130 | A | * | 8/1994 | Yardley et al. ................ 340/3.1 |
| 5,615,116 | A | * | 3/1997 | Gudat et al. .................... 701/23 |

(Continued)

FOREIGN PATENT DOCUMENTS

| JP | 05-274033 | 10/1993 |
| JP | 06-309029 | 11/1994 |

(Continued)

OTHER PUBLICATIONS

Korean Office Action for Korean Patent Application No. 10-2011-83238, issued on Mar. 29, 2013.

(Continued)

*Primary Examiner* — John Q Nguyen
*Assistant Examiner* — Aaron Smith
(74) *Attorney, Agent, or Firm* — Jones Robb PLLC

(57) ABSTRACT

An automatic guided vehicle and a method for drive control enable setting the vehicle alongside a conveyor with high accuracy in stopping at a task address. An automatic guided vehicle includes photoelectric sensors which detect the presence of an article by projecting light to a reflecting plate arranged on a conveyor and receiving signal light reflected from the reflecting plate and are arranged in one at each of the front and rear portions of the automatic guided vehicle, and a unit for detecting the distance between the vehicle and the conveyor. When both the photoelectric sensors arranged at the front and read portions of the side surface of the vehicle, a steering vehicle is steered toward the conveyor, and the automatic guided vehicle is driven toward the conveyor until the distance between the vehicle and the conveyor becomes within a predetermined distance.

19 Claims, 21 Drawing Sheets

(56) References Cited

U.S. PATENT DOCUMENTS

| | | | |
|---|---|---|---|
| 5,812,267 A * | 9/1998 | Everett et al. | 356/614 |
| 7,648,329 B2 * | 1/2010 | Chilson et al. | 414/809 |
| 2010/0010672 A1 * | 1/2010 | Wang et al. | 700/259 |

FOREIGN PATENT DOCUMENTS

| JP | 07-010208 | 1/1995 |
|---|---|---|
| JP | 09-258823 | 10/1997 |
| JP | 3458958 | 8/2003 |
| JP | 2010-061483 | 3/2010 |

OTHER PUBLICATIONS

JP Office Action for Japanese Patent Application No. 2010-197865, issued on Dec. 12, 2013.

* cited by examiner

MAP DATA CREATION

ROUTE DATA CREATION

FIG.9A B→C
FIG.9B B→E
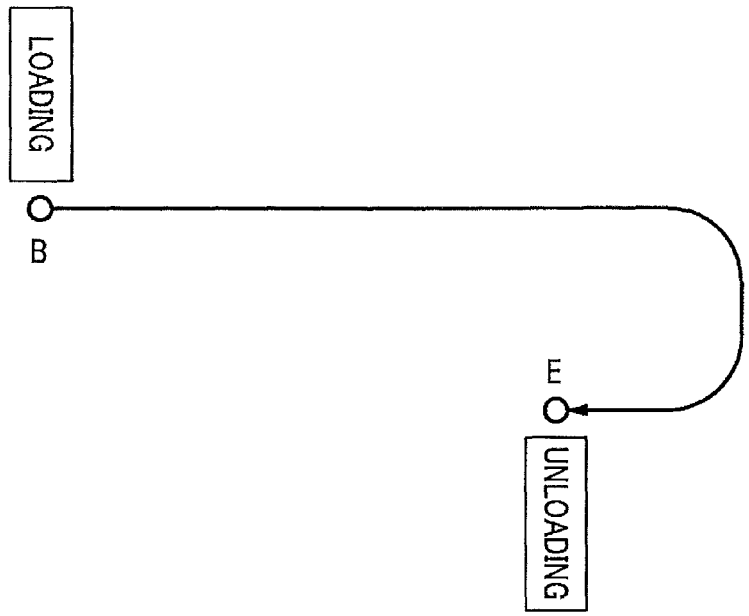
FIG.9C B→G
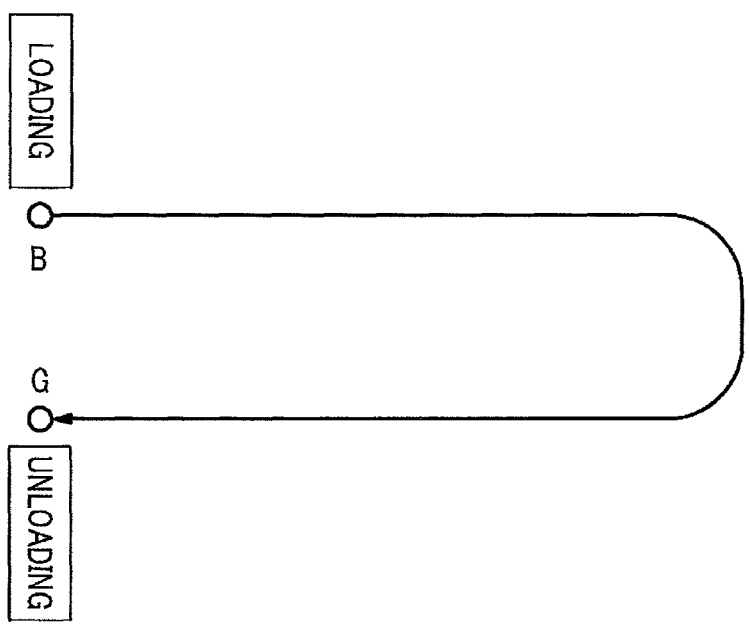

STOP

AUTOMATIC GUIDED VEHICLE AND METHOD FOR DRIVE CONTROL OF THE SAME

CROSS REFERENCE TO RELATED APPLICATION

The application claims the foreign priority benefit under Title 35, United States Code, Section 119(a)-(d) of Japanese Patent Application No. 2010-197865 filed on Sep. 3, 2010 the contents of which are hereby incorporated by reference.

BACKGROUND OF THE INVENTION

1. Field of the Invention

The present invention relates to a technology for an automatic guided vehicle and a method for drive control of the same.

2. Description of the Related Art

In a production line of a factory or a warehouse, an automatic guided vehicle (AGV) that is made automatically run on a target drive route and loads and unloads cargos by automatic control is introduced to save labor and improve the accuracy of carriage. As methods for stoppage control of such an automatic guided vehicle, various methods have been developed and applied.

Patent Document JP H09-258823 A discloses a stoppage control device, of an automatic guided vehicle, having a magnetic sensor for detection of a magnet that is arranged in the vicinity of a stoppage position of the automatic guided vehicle, and the stoppage control device performs stoppage control of the automatic guided vehicle, based on the detected information.

Patent Document 2 JP H05-274033 A discloses a stoppage positioning device, of an automatic guided vehicle, having a detector for detecting a detectable tool that is arranged at a stoppage position of the automatic guided vehicle, and the detector stops the automatic guided vehicle upon detection of such a detectable tool.

However, both the technologies described in the above-described Patent Documents perform stoppage control, based on a detectable object arranged on a route.

Accordingly, in a facility where a conveyor is used for loading an unloading cargos, it is necessary for practicing the technologies disclosed by the above-described Patent Documents to relocate or newly install detectable objects on a route in a case of relocating or newly installing a conveyor.

The present invention has been developed in the above-described background, and an object of the invention is to provide an automatic guided vehicle and a method for drive control of the same, wherein, in a situation when the automatic guided vehicle approaches an object, the automatic guided vehicle can be set alongside a precise conveyor in stopping at a task address (when approaching the object).

SUMMARY OF THE INVENTION

In order to solve the above-described problem, according to the present invention, an automatic guided vehicle that approaches an object by performing route data driving when the vehicle is distant from the object, the route data driving being based on preset route data, and starting sensor driving when the vehicle has come close to the object, the sensor driving being based on a sensor thereof, includes: a control section that determines whether or not a position obtained by the route data driving is a start point that is a position to start the sensor driving, and switches the route data driving to the sensor driving when the control section has determined that the vehicle is at the start point, to make the vehicle approach the object.

Other solutions will be described in a later-described embodiment, as appropriate.

BRIEF DESCRIPTION OF THE DRAWINGS

FIGS. 9A to 9C are diagrams showing an example of route data;

DETAILED DESCRIPTION OF THE PREFERRED EMBODIMENT

Figure 1:
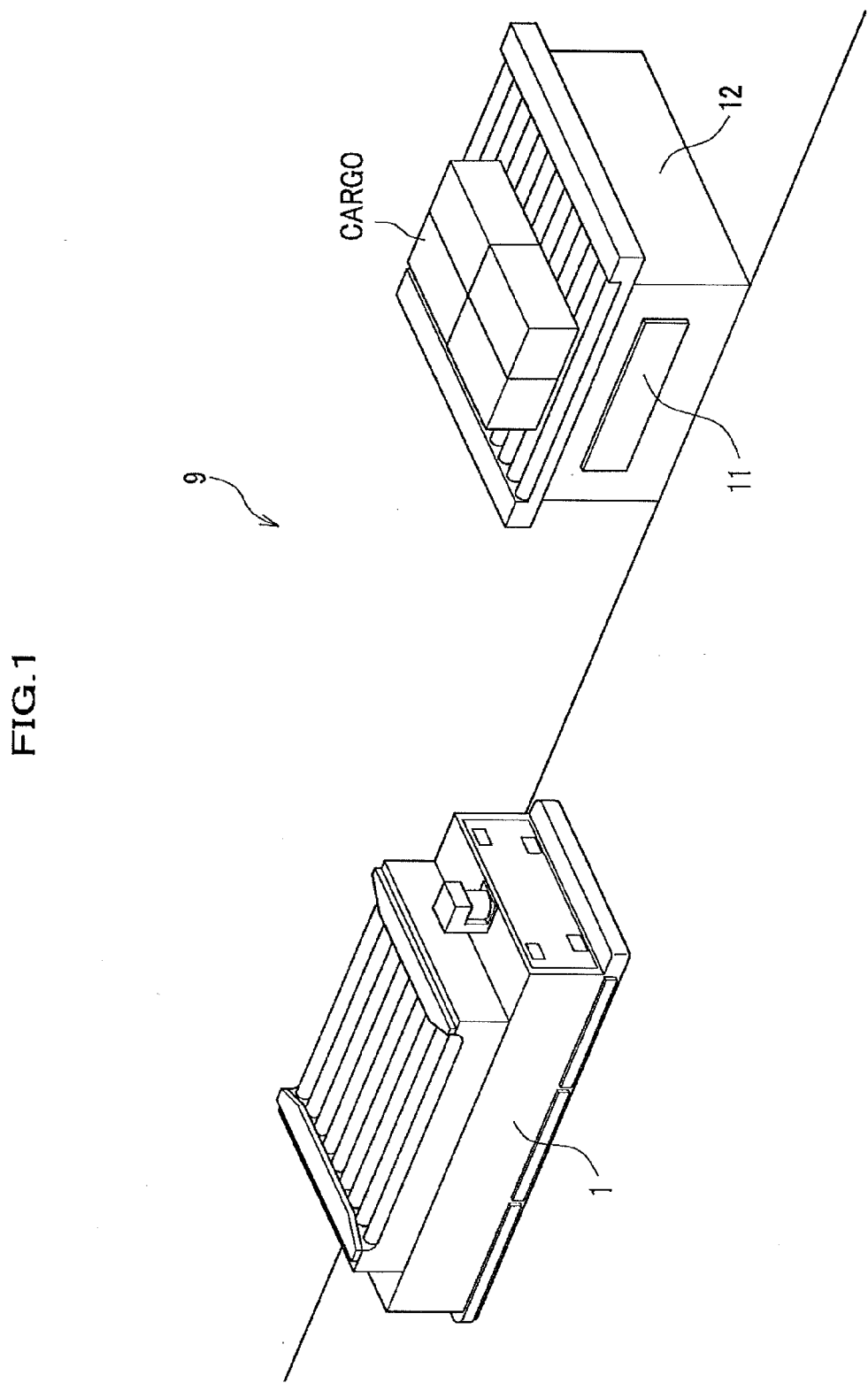
FIG. 1 is a diagram schematically showing an automatic conveying system according to the present embodiment.

A mode for carrying out the present invention (referred to as 'embodiment') will be described below in detail, referring to the drawings, as appropriate. The same reference symbols will be assigned to the similar elements in configuration in respective figures, and description of these will be omitted.

System Outline

FIG. 1 is a diagram schematically showing an automatic guided vehicle in the present embodiment.

In an automatic conveying system 9, an automatic guided vehicle 1 performs autonomous driving according to later-described route data in a work area in a factory or the like, autonomously sets itself alongside a conveyor (object) 12, and performs loading a cargo from a conveyor 12 onto the automatic guided vehicle 1, unloading a cargo from the automatic guided vehicle 1 onto the conveyor 12, or the like. A reflecting plate 11 is arranged at the lower portion of the conveyor 12. The automatic guided vehicle 1 defines a position for loading or unloading by detecting reflection of optical signals, which are projected from photoelectric sensors 80 (photo-detection sensors: later-described referring to FIG. 2) provided on itself, by the reflecting plate 11, or in another way.

System Configuration

Figure 2:
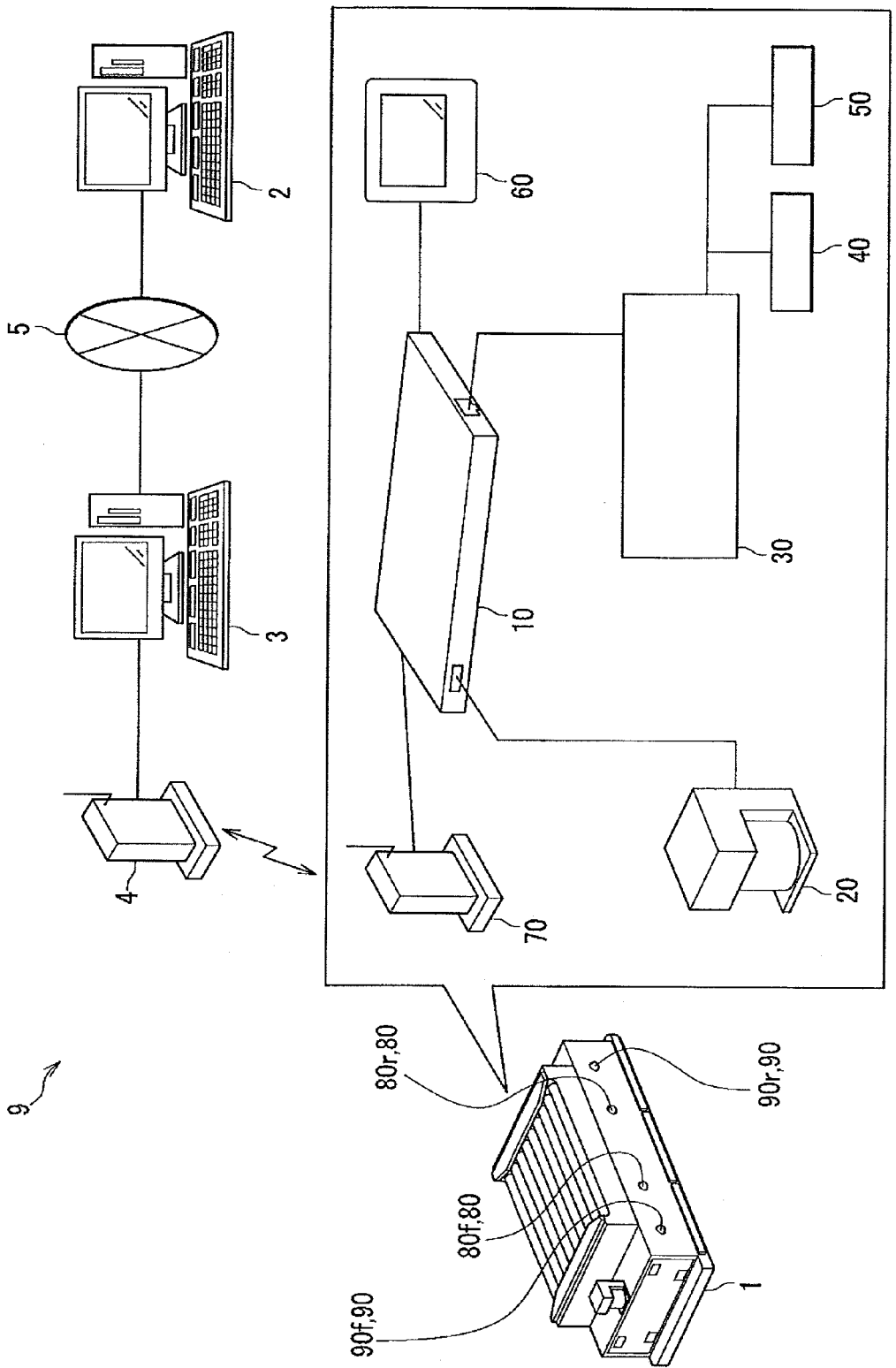
FIG. 2 is a diagram showing an example of a configuration of the automatic conveying system according to the present embodiment.

FIG. 2 is a diagram showing an example of a configuration of an automatic conveying system according to the present embodiment.

An automatic carrying system 9 includes an automatic guided vehicle 1, a host computer (an external device) 2, and an operation management computer (an external device) 3. Further, an upper-level host may be arranged on the host computer 2 (not shown).

The automatic guided vehicle 1 moves in a drive area according to route data 123 (FIG. 3), loads a cargo, moves, and unloads the cargo, for example.

The host computer 2 is connected with the operation management computer 3 via a network 5, such as a LAN (local area network), and has functions, such as creating map data 132 (FIG. 3) from measurement data 131 (FIG. 3) transmitted from the automatic guided vehicle 1, and the like, similarly to the transmission of the measurement data 131 to the operation management computer 3, and creating route data 133 by a user.

The operation management computer 3 has functions, such as creating map data 132 from the measurement data 131 (FIG. 3) transmitted from the automatic guided vehicle 1, and the like, similarly to the transmission of the measurement data 131 to the host computer 2, transmitting an instruction to the automatic guided vehicle 1 by a wireless LAN via a radio master station 4, and receiving a status report from the automatic guided vehicle 1.

The automatic guided vehicle 1 includes a controller 10, a laser distance sensor 20, a programmable controller 30, a steering wheel 40, running wheels 50, a touch panel display 60, and a radio slave station 70.

The controller 10 is a device that controls the operation of the automatic guided vehicle 1. The controller 10 will be described later in detail, referring to FIG. 3.

The laser distance sensor 20 is a sensor that can measure the distance to an object, projects a laser light, a millimeter wave, or the like, and measures the distance to an obstacle by detecting a reflected light (reflected wave). The laser distance sensor 20 is fitted at a position, on the automatic guided vehicle 1, the position enabling measurement in an angle greater than or equal to 180 degrees for scanning with a laser wave or a millimeter wave widely in the left and right directions. That is the laser distance sensor 20 is rotatable in a range greater than or equal to 180 degrees, and thereby capable of projecting a laser light at each predetermined angle.

The programmable controller 30 is a device that performs control of the steering wheel 40 controlled with the steering angle as a parameter and the running wheels 50 controlled with the velocity as a parameter.

The touch panel display 60 is an information input/output device for performing various settings and maintenance of the automatic guided vehicle 1.

The radio slave station 70 is a device that receives a communication message transmitted from the radio master station 4 and delivers the message to the controller 10.

Photoelectric sensors 80 and a distance measuring sensors 90 are arranged on the side face of the automatic guided vehicle 1. The photoelectric sensors 80 and the distance measuring sensors 90 are arranged to define a position in setting the automatic guided vehicle 1 along the conveyor 12 (FIG. 1) as described later. As the photoelectric sensors 80, one photoelectric sensor 80 is arranged at each of the front part and the rear part (the front photoelectric sensor 80f and the rear photoelectric sensor 80r). Also as the distance measuring sensors 90, one distance measuring sensor 90 is arranged at each of the front part and the rear part (the front distance measuring sensor 90f and the distance measuring sensor 90r). The fitting positions of the front photoelectric sensor 80f and the rear photoelectric sensor 80r are within a width of the reflecting plate 11 (FIG. 1) arranged on the conveyor 12. The fitting positions of the front distance measuring sensor 90f and the distance measuring sensor 90r are within the width of the conveyor 12.

As the distance measuring sensors 90, any type of sensor, such as an infrared ray distance sensor, ultrasonic distance sensor, or a laser distance sensor, can be employed as long as the sensors 90 enable measuring the distance to an object.

In the present embodiment, the photoelectric sensors 80 and the distance measuring sensors 90 are arranged on one side face of the automatic guided vehicle 1, however, in a case that the automatic guided vehicle 1 is aimed at loading and unloading on both sides, photoelectric sensors 80 and distance measuring sensors 90 may be arranged on the both side faces. Incidentally, instead of providing the photoelectric sensors 80 and the distance measuring sensors 90, using a function, of the laser distance sensor 20 as a sensor, to estimate the self-position, the automatic guided vehicle 1 may approach the conveyor 12 (the object) through determining the distance between the automatic guided vehicle 1 and the conveyor 12.

Configuration of Controller

A configuration of a controller will be described below, based on FIG. 3 and referring to FIG. 2.

Figure 3:
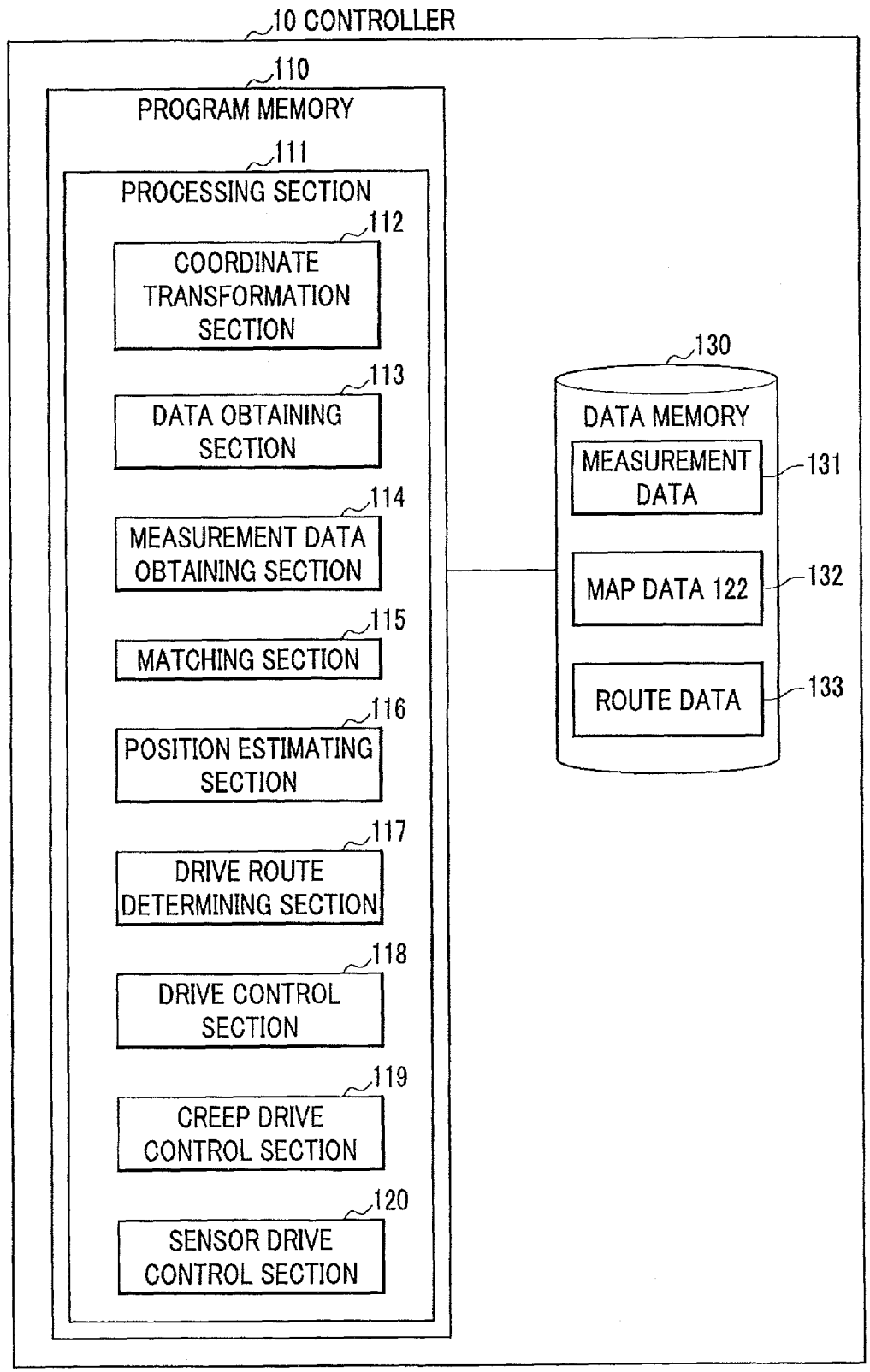
FIG. 3 is a block diagram showing an example of a configuration of a controller in the automatic guided vehicle according to the present embodiment.

FIG. 3 is a block diagram showing an example of a configuration of a controller in the automatic guided vehicle according to the present embodiment.

The controller 10 includes a program memory 110, such as a ROM (read only memory), a data memory (storage section) 130, such as a RAM (random access memory), and a CPU (central processing unit), not shown.

The data memory 130 stores the measurement data 131, the map data 132, and the route data 133.

The measurement data 131 is data related to the distances to obstacles measured by the laser distance sensor 20.

The map data 132 is map information that has been created as a result of recognition processing, based on the measurement data 131, by the host computer 2, the operation management computer 3, or a personal computer, not shown, for creating map data and then transmitted, and is map information on the drive area where the automatic guided vehicle 1 runs. The map data 132 will be described later.

The route data 133 is route information with which driving of the automatic guided vehicle 1 is scheduled, and is created on the map data 132. Similarly to the map data 132, the route data 133 is created by a user with editing software executed on the host computer 2 or the like with reference to the map data 132. The route data 133 is transmitted from the host computer 2, the operation management computer 3, or the personal computer, not shown, for creating map data to the automatic guided vehicle 1 and then stored in the data memory 130. The route data 133 includes, for example, information on the velocity of the automatic guided vehicle 1 at respective positions. The route data 133 will be described later.

The program memory 110 stores programs for control of the automatic guided vehicle 1. By executing these programs with the CPU, a processing section (control section) 111 for processing information is implemented. The processing section 111 includes a coordinate transformation section 112, a data obtaining section 113, a measurement data obtaining section 114, a matching section 115, a position estimating section 116, a drive route determining section 117, a drive control section 118, a creep drive control section 119, and a sensor drive control section (control section) 120.

The coordinate transformation section 112 has a function to transform a target address included in an task instruction obtained from the host computer 2 into coordinates defined by the map data 132 (in other words, coordinates that are set in the drive area). Herein, an address represents a certain position in the drive area where the automatic guided vehicle 1 runs.

The data obtaining section 113 has a function to obtain various data, such as the route data 133 and the map data 132, from the data memory 130.

The measurement data obtaining section 114 has a function to obtain the measurement data 131, which has been collected by the laser distance sensor 20, during manual operation by a remote controller or drive control of the automatic guided vehicle 1.

The matching section 115 has a function to perform matching between the measured data 131 transmitted from the laser distance sensor 20 during drive control of the automatic guided vehicle 1 and the map data 132.

The position estimating section 116 has a function to estimate the current position of the automatic guided vehicle 1, based on a result of matching by the matching section 115.

The drive route determining section 117 has a function to determine the next movement target position on a route, based on the velocity information on the automatic guided vehicle 1 included in the route data 133 and the current position estimated by the position estimating section 116. Further, the drive route determining section 117 also has a function to compute the steering angle from the deviation of the automatic guided vehicle 1 from the route.

The drive control section 118 has a function to instruct velocity information included in the route data 133 or a steering angle computed by the drive route determining section 117 to the programmable controller 30.

The creep drive control section 119 has functions to decelerate the automatic guided vehicle 1 to a creep velocity (fine slow velocity) when the automatic guided vehicle 1 has come close to a target address, and to move the automatic guided vehicle 1 to a certain position in the vicinity of the conveyor 12.

The sensor drive control section 120 has a function to set the automatic guided vehicle 1, which has been moved to the vicinity of the conveyor 12 by the creep drive control section 119, alongside the conveyor 12, based on information obtained from the photoelectric sensors 80 (FIG. 2) and the distance measuring sensors 90 (FIG. 2).

In order to drive the automatic guided vehicle 1, it is necessary to create and store the map data 132 and the route data 133 before setting the automatic guided vehicle 1 online (automatic driving). Further, it is necessary to associate target addresses and the coordinates of the route data 133. The procedure of creating the map data 132 and the route data 133 will be described below, based on FIGS. 4 to 10 and referring to FIGS. 2 and 3.

Process of Creating Map Data

Figure 4:
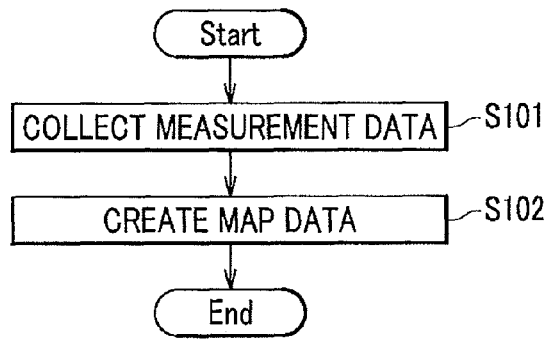
FIG. 4 is a flowchart showing a procedure of a process of creating map data.
Figure 5:
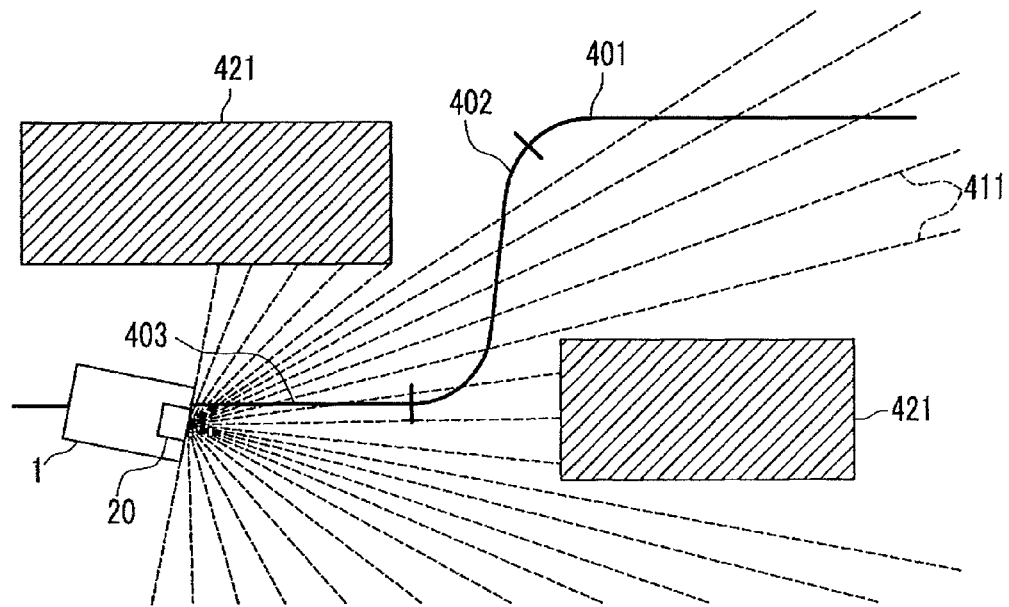
FIG. 5 is a diagram showing a method for collecting measurement data.

FIG. 4 is a flowchart showing a procedure of a process of creating map data. FIG. 5 is a diagram showing a method for collecting measurement data.

First, a user manually drives the automatic guided vehicle 1 at a low velocity with a remote controller or the like, while viewing the surrounding. During this, the laser distance sensor 20 collects measurement data 121 (S101).

Herein, as show in FIG. 5, the laser distance sensor 20 rotates a laser projecting section, not shown, for example, 0.5 degrees by 0.5 degrees and totally by 180 degrees (or more than 180 degrees), while the laser projecting section projecting a laser light 411 with a period of 30 ms. This means that measurement is performed for an angle of 180 degrees each time the automatic guided vehicle 1 moves 1 to 10 cm. The laser distance sensor 20 receives a reflected light of the projected laser light 411, and a distance to an obstacle 421 is computed (measured), based on the time from when the laser light 411 is projected until when the reflected light is received. The measurement data obtaining section 114 stores data related to the calculated distances to the obstacles as the measurement data 131 in the data memory 130. Incidentally, the measurement data 131 is collected with a constant interval of time. Reference symbols 401 to 403 will be described later.

After all the measurement data 131 in the area are collected, the measurement data 131 is output via an external interface, not shown, or the like, to the host computer 2, the operation management computer 3, or the personal computer, not shown, for creating map data.

Then, the user operates the software for creating a map that is operating on the host computer 2, the operation management computer 3, or the personal computer, not shown, for creating map data, and the map data 132 based on the measurement data 131 having been output is thereby created (S102 in FIG. 4). Concretely, the respective collected measurement data 131 are superimposed to create the map data 132.

The created map data 132 is transmitted via the external interface, not shown, or the like, to the automatic guided vehicle 1, and stored in the data memory 130.

Incidentally, the map data 132, which has been created once, is not updated unless the process in steps S101 to S102 is again performed.

Example of Map Data

Figure 6:
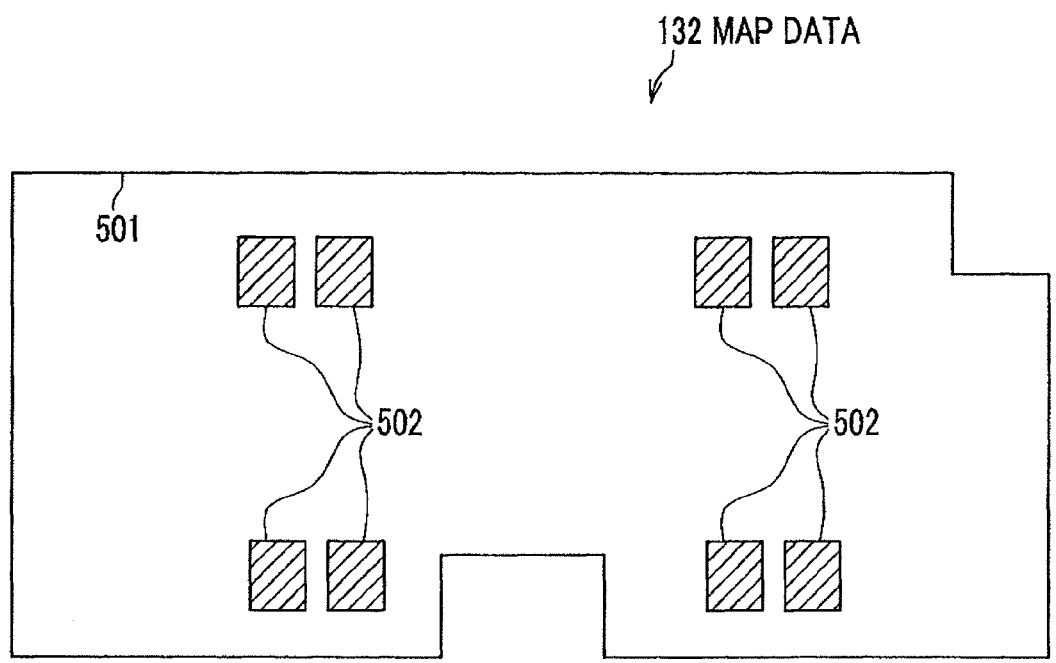
FIG. 6 is a diagram showing an example of map data.

FIG. 6 is a diagram showing an example of map data.

As shown in FIG. 6, in the map data 132, walls 501 and obstacles 502 in the drive area are recorded as data.

Process of Creating Route Data

A process of creating route data in advance that represents a route on which the automatic guided vehicle 1 is to run will be described below, referring to FIGS. 7 to 10.

Figure 7:
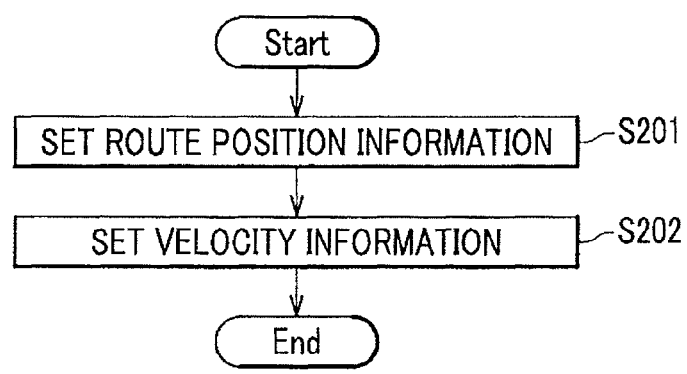
FIG. 7 is a flowchart showing a procedure of a process of creating route data.

FIG. 7 is a flowchart that shows the procedure of the process of creating route data.

First, using route creation software executed on the host computer 2, the operation management computer 3, or the personal computer, not shown, for creating map data, the user sets route position information by designating a route on the map data 122 (S201). The route creation software has a function to enable a user to easily create a route on a map by dragging with a pointing device, such as a mouse, on a displayed map screen, referring to the displayed map data by the route creation software. The route position information created in such a manner is data expressed by a sequence of coordinates which are defined in the map data 132. Further, in setting the route position information, the user sets correspondence information between addresses and the coordinates in the route data 133 by setting the addresses.

Then, the user sets velocity information that designates velocities when the automatic guided vehicle 1 automatically runs on the route created with the route creation software (S202). For example, describing with reference to FIG. 5, the velocity information is set such that the automatic guided vehicle 1 runs at the second velocity (1.2 [km/h]) in the first section 403, at the first velocity (0.6 [km/h]) in the subsequent curved section 402, and at the third velocity (2.4 [km/h]) in the section 401 after the curve.

Velocity setting can be performed in several steps in an order, such as the creep velocity (fine low forward velocity), the first velocity, the second velocity, etc. For example, ten divided velocities may be determined with the maximum velocity of 9 km/hr (150 m/min). However, the creep velocity is to be determined as a velocity lower than the first velocity (for example, 0.3 km/hr).

Example of Route Data

An example of route data 133 will be described below, referring to FIGS. 8 and 9.

Figure 8:
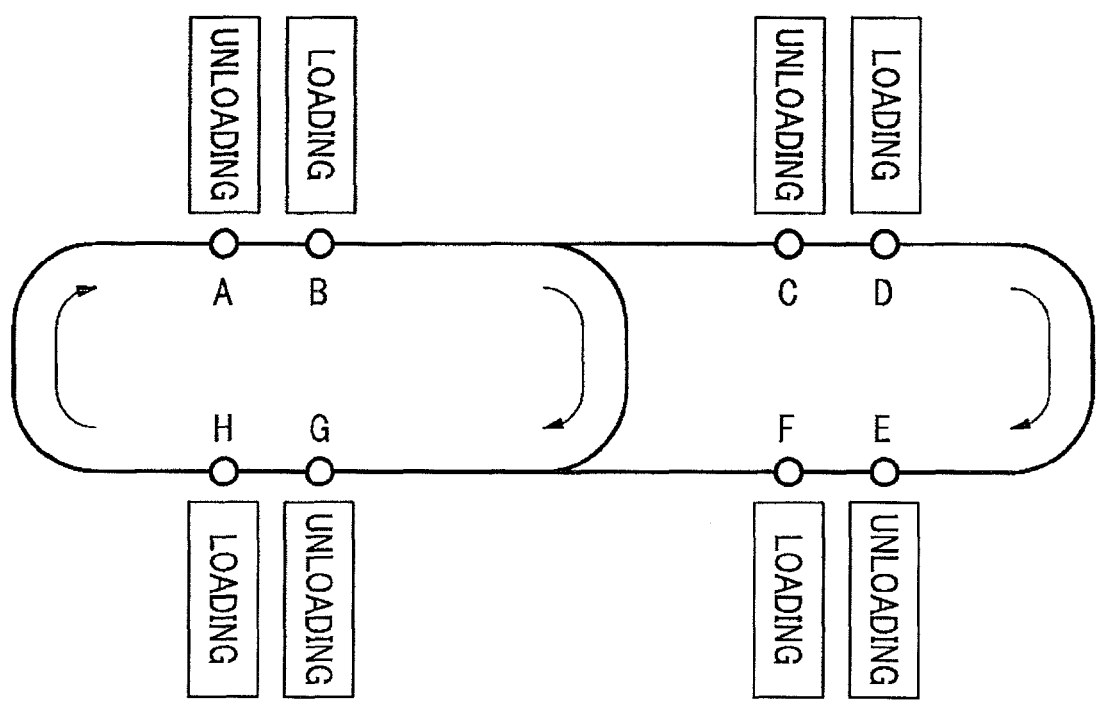
FIG. 8 is a diagram showing an example of a route.

FIG. 8 is a diagram showing an example of a route.

FIG. 8 shows an example of a route in a drive area of the automatic guided vehicle 1 in a factory. Symbols A to H represent addresses A to H.

In FIG. 8, address A, address C, address E, and address G represent positions where 'unloading task' is performed. Address B, address D, address F, and address H represent positions where 'loading task' is performed.

Incidentally, designation of addresses is a legacy inheritance from conventional systems in which an automatic guided vehicle runs on a white line.

FIGS. 9A to 9C show examples of route data.

In FIGS. 9A to 9C, symbols B, C, E and G correspond to symbols B, C, E, and G in FIG. 8.

FIG. 9A shows a route for loading a cargo at address B and unloading the cargo at address C (B→C).

Likewise, FIG. 9B shows a route for loading a cargo at address B and unloading the cargo at address E (B→E), and FIG. 9C shows a route for loading a cargo at address B and unloading the cargo at address G (B→G).

In such a manner, route data 133 can be designated by 'a loading position→an unloading position' or 'an unloading position→a loading position'.

In the example in FIG. 8, settable route data 133 is, for example, as follows.

(1) unloading→loading
A→B, A→D, A→F, A→H
C→B, C→D, C→F, C→H
E→B, E→D, E→F, E→H
G→B, G→D, G→F, G→H
(2) loading→unloading
B→A, B→C, B→E, B→G
D→A, D→C, D→E, D→G
F→A, F→C, F→E, F→G
H→A, H→C, H→E, H→G Based on the measurement data 131 collected by a single automatic guided vehicle 1, the map data 132 and the route data 133 are created by the host computer 2, operation management computer 3, or the personal computer, not shown, for creating map data, and are applied to every automatic guided vehicle 1 that is used.

Incidentally, map data 132 and route data 133 can also be individually created for one by one of all automatic guided vehicles 1 that are set online. This is because individual application is considered more effective than applying map data 132 collected by a single automatic guided vehicle 1 to all automatic guided vehicles 1 in a case that individual differences in a laser distance sensor 20 and a drive system (steering wheel 40, running wheels 50) are significant.

Figure 10:
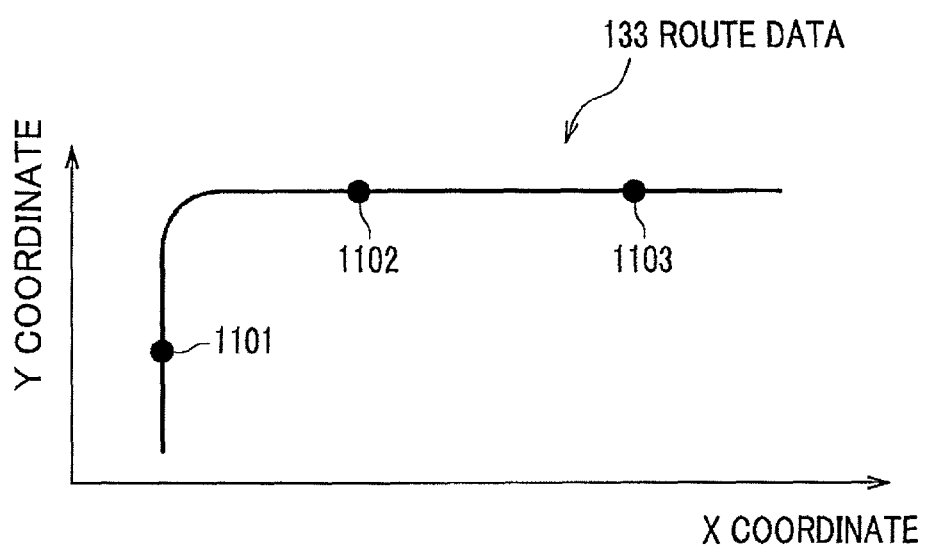
FIG. 10 is a diagram showing an example of correspondence information between a route and coordinates according to the present embodiment.

FIG. 10 is a diagram showing an example of correspondence information between the route and coordinates according to the present embodiment.

As shown in FIG. 10, for the route data 133, the route is managed with coordinates. Concretely, the route data 133 is expressed by a sequence of coordinates. Data that associates the addresses 1101 to 1103 with coordinates is also stored for the route data 133. Incidentally, the addresses 1101 to 1103 correspond to the addresses A to H in FIGS. 8 and 9.

Control Process During Driving

Processing in automatically driving the automatic guided vehicle 1 will be described below, based on FIGS. 11 and 12 and referring to FIGS. 2 and 3.

Figure 11:
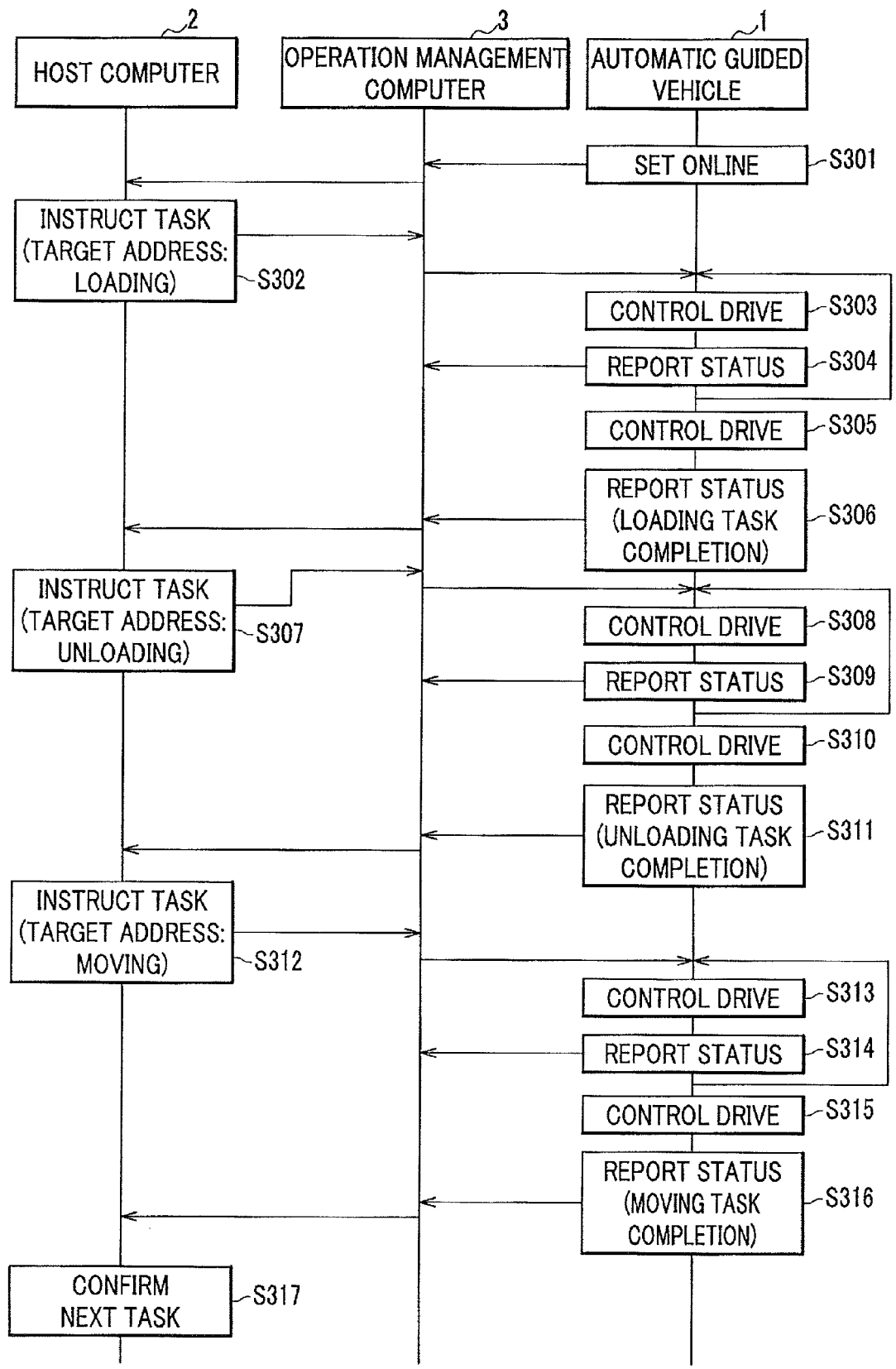
FIG. 11 is a sequence diagram showing a procedure of a process during driving the automatic guided vehicle according to the present embodiment.

FIG. 11 is a sequence diagram showing the procedure of a process in driving the automatic guided vehicle according to the present embodiment.

In setting an automatic guided vehicle 1 online, the user first moves the automatic guided vehicle 1 to a certain address, and inputs the current address via, for example, a touch panel display 60.

The automatic guided vehicle 1 thereby transmits information notifying that the automatic guided vehicle 1 has been set online to the host computer 2 (S301). Herein, the setting online also acts as an inquiry as to the next task.

The host computer 2 having received, via the operation management computer 3 from the automatic guided vehicle 1, the information (a current position and a status of the automatic guided vehicle 1) that also acts as an inquiry as to the next task transmits an instruction for a task to the automatic guided vehicle 1 (S302). In this instruction for a task, information on a target address and the content of a task to be performed at the target address is stored (A loading task is performed in the example of step S302).

The automatic guided vehicle 1 having received, via the operation management computer 3, the instruction for a task performs a drive control, which will be later described with reference to FIG. 12 (S303), and reports a current status (information on address passing, information on task completion, etc.) to the operation management computer 3 (S304).

The automatic guided vehicle 1 repeats the process in step S303 and step S304 until the automatic guided vehicle 1 arrives at the target address.

Then, subsequent to the drive control (S305), when the automatic guided vehicle 1 has arrived at the target address and completed the task (herein a loading task), the automatic guided vehicle 1 transmits a status report notifying that the loading task has been completed, to the operation management computer 3 (S306).

The operation management computer 3 having received the status report notifying that the loading task has been completed transmits a similar status report to the host computer 2.

Then, the host computer 2 transmits, via the operation management computer 3, an instruction for an unloading task as the next task to the automatic guided vehicle 1 (S307). In this task instruction, information on a target address and the content of the task are stored (an unloading task in the example in step S307).

The automatic guided vehicle 1 having received the task instruction via the operation management computer 3 performs drive control, which will be described later referring to FIG. 12 (S308), and reports the current status (information on address passing, information on task completion, etc.) to the operation management computer 3 (S309).

The automatic guided vehicle 1 repeats the process in step S308 and step S309 until the automatic guided vehicle 1 arrives at the target address.

Then, subsequent to the drive control (S310), when the automatic guided vehicle 1 has arrived at the target address and completed the task (herein an unloading task), the automatic guided vehicle 1 transmits a status report (unloading task completion report) notifying that the unloading task has been completed, to the operation management computer 3 (S311). This also acts as an inquiry as to the next task.

The operation management computer 3 having received the status report notifying that the unloading task has been completed transmits a similar status report to the host computer 2.

The host computer 2 having received, via the operation management computer 3, the unloading task completion report transmits the next task instruction to the automatic guided vehicle 1 (S312).

Herein, it is assumed that movement (not performing a loading task or an unloading task) is instructed as the content of a task.

The automatic guided vehicle 1 having received the task instruction via the operation management computer 3 performs drive control, which will be described later with reference to FIG. 12 (S313), and reports the current status (information on address passing, information on task completion, etc.) to the operation management computer 3 (S314).

The automatic guided vehicle 1 repeats the process in step S313 and step S314 until the automatic guided vehicle 1 arrives at the target address.

Then, subsequent to the drive control (S315), when the automatic guided vehicle 1 has arrived at the target address, the automatic guided vehicle 1 transmits a status report notifying that it has arrived at the target address (movement task completion report), to the operation management computer 3 (S316). This also acts as an inquiry as to the next task.

The operation management computer 3 having received the status report notifying that the movement task has been completed transmits a similar status report to the host computer 2.

The host computer 2 having received, via the operation management computer 3, the movement task completion report confirms about the next task (S317).

Incidentally, although, in FIG. 11, the host computer 2 having received the report of completion of the loading task in step S306 immediately transmits an instruction for an unloading task, which is the next task, to the automatic guided vehicle 1, the host computer 2 may transmit the instruction for the next task to the automatic guided vehicle 1 after receiving an inquiry as to the next task from the automatic guided vehicle 1. This is also possible likewise in the case of an unloading task or a movement task.

Further, in FIG. 11, in a case that the automatic guided vehicle 1 has not yet arrived at the target address, arrangement may be made such that the automatic guided vehicle 1 does not perform status reporting.

Still further, when an abnormality has occurred on the automatic guided vehicle 1, the automatic guided vehicle 1 autonomously obtains the current position if the current address is input to the automatic guided vehicle 1, for example, via the touch panel 60 similarly to the case of setting the automatic guided vehicle 1 online.

Process of Drive Control

Figure 12:
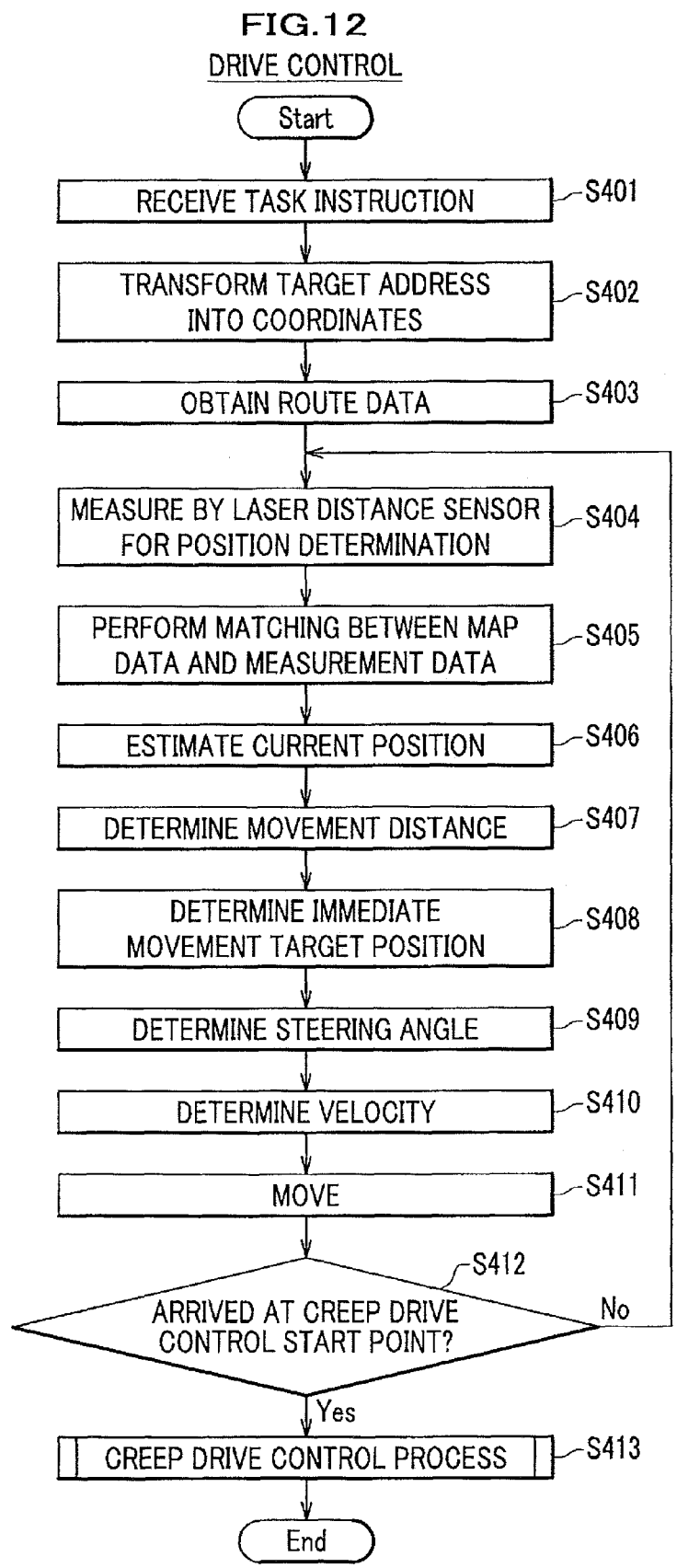
FIG. 12 is a flowchart showing a procedure of a process of drive control according to the present embodiment.

FIG. 12 is a flowchart showing the procedure of a process of drive control according to the present embodiment. The process in FIG. 12 corresponds to the details of the process in steps S303, S305, S308, S310, S313, and S315 in FIG. 11.

First, the automatic guided vehicle 1 receives a task instruction via the operation management computer 3 (S401).

Then, the coordinate transformation section 112 of the automatic guided vehicle 1 transforms the target address included in a task instruction into coordinates, according to the correspondence information between addresses and coordinates stored in the route data 133 (S402).

When the data obtaining section 113 of the automatic guided vehicle 1 selects a piece of the route data 133 going from the current address to the target address, from the route data 133 stored in the data memory 130, the data obtaining section 113 obtains the piece of route data 133 (S403).

Subsequently, measurement by a laser distance sensor is performed to determine a position, wherein the laser distance sensor 20 performs laser distance measurement, which has been described with reference to FIG. 5, and the measurement data obtaining section 114 obtains a result of the laser distance measurement (S404).

Then, the matching section 115 performs matching between the map data 132 stored in the data memory 130 and the measurement data 131 obtained in step S404 (S405), and the position estimating section 116 estimates the current position (X, Y) of the automatic guided vehicle 1, based on the matching result in step S405 (S406). The process in step S405 and step S406 is a technology described in the specification of JP 4375320 B2 and the like, and detailed description will be accordingly omitted. In brief, a part that agree with the shape of the measurement data 131 is searched on the map data 132, and the current position of the automatic guided vehicle 1 is estimated from a result of the searching. The estimated current position is obtained in a form of coordinates.

Then, the drive route determining section 117 determines the movement distance d and the actual movement distance da, based on velocity information v that is set in the route data 133 (S407). Computation of the actual movement distance da will be described later, referring to FIGS. 13 and 14.

Incidentally, in step S407, in a case that the automatic guided vehicle 1 is deviated from the route, the drive route determining section 117 uses velocity information that is set for the part, which is the closest from the automatic guided vehicle 1, of the route. In the present embodiment, a perpendicular line is extended from the reference point of the automatic guided vehicle 1 to the route, and velocity information that is set for the intersection point between the perpendicular line and the route is used. Incidentally, in the present embodiment, the center of the front face of the automatic guided vehicle 1 is defined to be the reference point of the automatic guided vehicle 1.

Arrangement is made such that the larger the movement distance is determined the larger the velocity that is set in the route data 133. For example, arrangement may be made such that the velocity and the movement distance have a proportional relationship, or such that the velocity and the movement distance have a relationship of a quadratic function or a higher-dimensional function.

An example of the relationship between a velocity and a movement distance d will be described below. In order that the automatic guided vehicle 1 arrives at the movement target, which is the end point of the movement distance d, by the time of the next distance sensor measurement, a sufficient length is applied.

first velocity: 5.0 mm/30 ms (0.6 km/h), movement distance d: 100 mm second velocity: 10.0 mm/30 ms (1.2 km/h), movement distance d: 200 mm third velocity: 20.0 mm/30 ms (2.4 km/h), movement distance d: 300 mm fourth velocity: 26.7 mm/30 ms (3.2 km/h), movement distance d: 400 mm Herein, a distance is taken for each 30 ms because the interval of measurement by the laser distance sensor 20 is set to 30 ms in this example. The value changes with the measurement interval.

Subsequent to step S407, the drive route determining section 117 determines the immediate movement target position by determining movement target coordinates to be the target on the route, based on the movement distance d obtained in step S407 and the current position coordinates (X, Y) (S408).

Then, the drive route determining section 117 determines the steering angle θ, based on the current coordinates (X, Y) and the movement target coordinates determined in step S408 (S409). The process in step S409 will be described later, referring to FIGS. 13 and 14.

Further, the drive route determining section 117 determines the velocity by again obtaining a velocity v that is set on the route from the route data 133, based on the current coordinates (X, Y) (S410).

At this moment, as the steering angle θ and the velocity v for moving the automatic guided vehicle 1 have been determined, the drive control section 118 transmits these parameters to the programmable controller 30 and thereby moves the automatic guided vehicle 1 toward the movement target that is the end point of the movement distance d (S411). Actually, the next measurement by the laser distance sensor 20 is performed at a timing earlier than the end of the movement time for the movement distance d.

Incidentally, the process from steps S404 to S411 corresponds to a drive according to the route data.

At the time of the next measurement by laser distance sensor (30 msec later), the drive control section 118 determines whether or not the automatic guided vehicle 1 has arrived at the start point of creep drive control (S412). There are the following two methods for determining whether or not the automatic guided vehicle 1 has arrived at the start point of creep drive control. In one of these methods, the coordinates of the start point of creep control drive are input in advance. In the other method, the creep drive control section 119 detects whether or not the current positions has come into a predetermined distance from the target address to make a determination.

As a result of step S412, if the automatic guided vehicle 1 has not yet arrived at the start point of creep drive control (S412→No), the controller 10 returns the process to step 404.

As a result of step S412, if the automatic guided vehicle 1 has arrived at the start point of creep drive control (S412→Yes), the creep drive control section 119 and the sensor drive control section 120 performs a process for creep drive control later-described with reference to FIGS. 20 and 21 (S413), and then the process for drive control is terminated.

Determination of Steering Angle and Actual Movement Distance

A method for determining the steering angle and the actual movement distance during normal drive will be described below, based on FIGS. 13 and 14 and referring to FIGS. 2 and 3. This is the process performed in steps S407 and S409 in FIG. 12. Herein 'normal drive control' refers to drive control not during creep drive control or sensor drive control.

Figure 13:
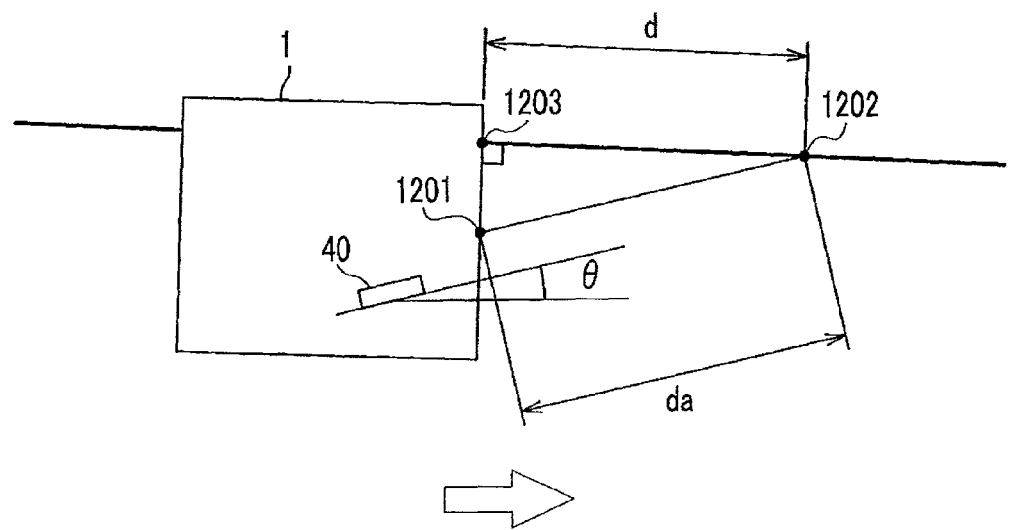
FIG. 13 is a diagram illustrating a method for determining a steering angle and an actual movement distance in a case that a route is linear.

FIG. 13 is a diagram that illustrates a method for determining the steering angle and the actual movement distance in a case that a route is a line as shown by the thick solid line.

In the present embodiment, the center of the front face of the automatic guided vehicle 1 is set as a reference point 1201 of the automatic guided vehicle 1. When the movement distance d is obtained based on the velocity, the drive route determining section 117 obtains the point that corresponds to the movement distance d from the root end 1203 of the perpendicular line extended from the reference point 1201 of the automatic guided vehicle 1 to the route (a sequence of coordinates represented by the route data 132), wherein the point is represented by movement target coordinates 1202. Then, the drive route determining section 117 sets the angle of the steering wheel 40 to the steering angle θ so as to move (direct) the automatic guided vehicle 1 toward the movement target coordinates 1202.

Herein, the actual movement distance da and the movement distance d have a relationship represented by da=d/cos θ.

Figure 14:
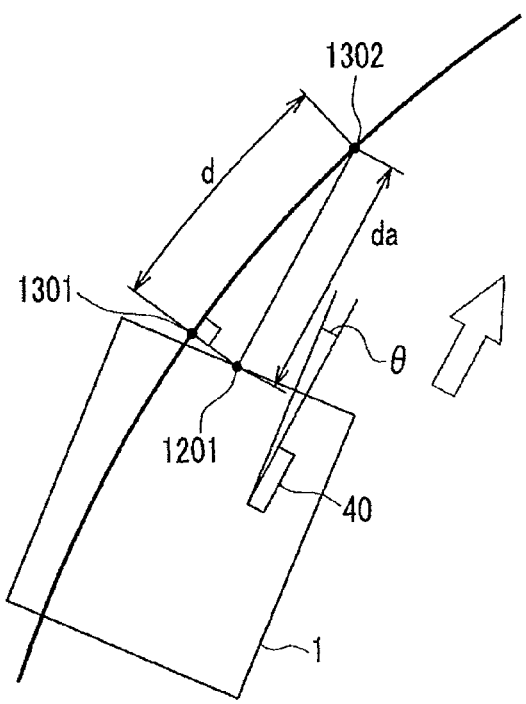
FIG. 14 is a diagram illustrating a method for determining a steering angle and an actual movement distance in a case that a route is curved.

FIG. 14 is a diagram that illustrates a method for determining the steering angle and the actual movement distance in a case that a route is a curve as shown by the solid curve.

Also in a case of a curved route, the drive route determining section 117 obtains the root end 1301 (the point that has the shortest distance on the route from the reference point 1201 of the automatic guided vehicle 1), on the route, of a line extending from the reference point 1201 of the automatic guided vehicle 1 and perpendicular to the route, computes the movement target coordinates 1302 on the route with the length of the curve from the point 1301 as the movement distance d, and determines thereby the movement target coordinates 1302 on the route. In such a method, although the required amount of computation is large, it is possible to accurately obtain the movement target coordinates 1302 on a route even when the curvature of the route is large.

Incidentally, the actual movement distance da and the movement distance d have a relationship represented by da=d/cos θ.

According to the method illustrated in FIGS. 13 and 14, even when the current coordinates are not on the route, it is possible to determine the steering angle and the velocity so that the current coordinates come to be on the route at the next movement target coordinates.

As has been described above, in the present embodiment, as the velocity of the automatic guided vehicle 1 becomes larger corresponding to the drive velocity, the movement distance is set larger and the movement target coordinates as the target on the route are set farther. Accordingly, the automatic guided vehicle 1 can be controlled such as to stably run with small fluctuation.

Process for Stoppage Control

A process for stoppage control according to the present embodiment will be described below, based on FIGS. 15A to 24B and referring to FIGS. 1 to 3.

Overview

FIGS. 15A to 19B are diagrams for illustration of the overview of a process for stoppage control according to the present embodiment. Incidentally, in FIGS. 15A to 19B, description of elements represented by the symbols having been described above with reference to FIGS. 1 and 2 will be omitted.

Figure 15A:
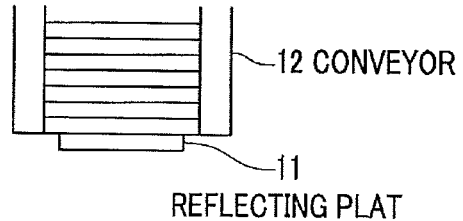
FIGS. 15A and 15B are diagrams schematically illustrating a process for stoppage control according to the present embodiment (No. 1)

First, as shown in FIG. 15A, the automatic guided vehicle 1 runs toward a target address 1502 on a route 1501. When the automatic guided vehicle 1 (the center thereof) has arrived at the start point of creep drive control, the creep drive control section 119 newly creates (creates while driving), as shown in FIG. 5B, data (creep route data) of a creep route 1503 and a creep target address 1504. The creep target address 1504 corresponds to 'the start point that is the position of starting a sensor drive'.

Figure 15B:
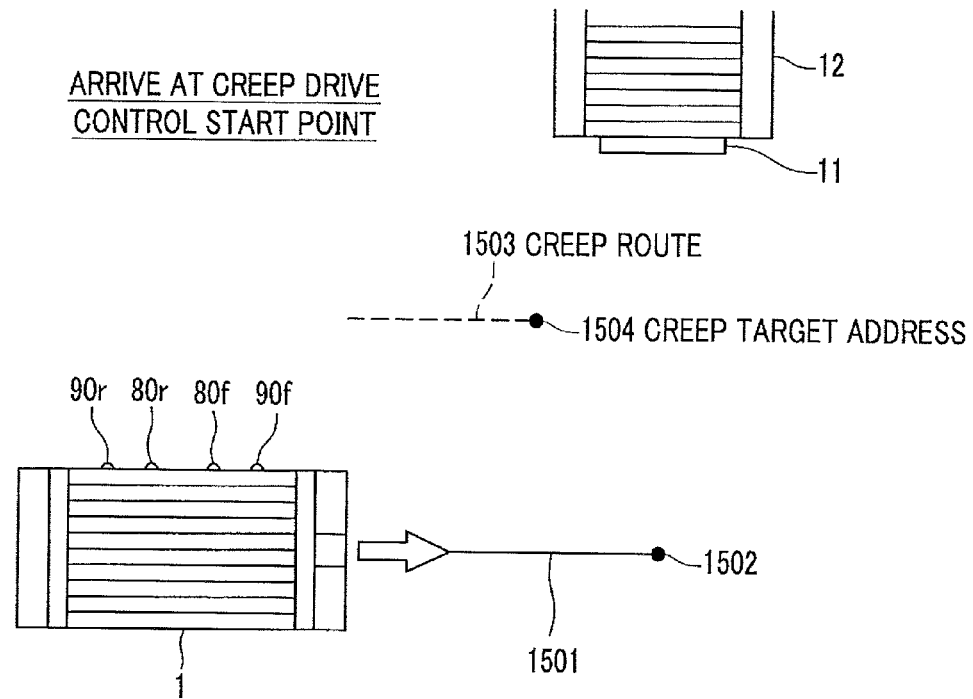

Incidentally, as a method for determining whether or not the automatic guided vehicle 1 has arrived at the start point of creep drive control, there are two methods, namely a method in which the coordinates of the start point of creep drive control are input in advance in the route data 133 and a method in which the creep drive control section 119 detects whether or not the current position has come into a predetermined distance from the target address to make a determination. Incidentally, as shown in FIG. 15B, the route 1501 and the creep route 1503 may be discontinuous and may be continuous.

Creation of the creep route data and the creep target address 1504 will be described below, referring to FIG. 16.

While the route 1501 of the route data 133 and the target address 1502 on the route represent an approximate position, the creep target address 1504 and the creep route 1503 of the creep route data represent a detailed position for enabling easy fine adjustment (sensor drive control) using the photoelectric sensors 80 and the distance measuring sensors 90.

The creep target address 1504 and the creep route 1503 are managed with front coordinates and rear coordinates. In FIG. 16, the front coordinates are set to the coordinates of the center between the two front wheels, and the rear coordinates are set to the coordinates of the center between the two rear wheels. However, for example, the front coordinates may be set to the center of the front part of the automatic guided vehicle 1, and the rear coordinates may be set to the center of the rear part of the automatic guided vehicle 1. Further, the front coordinates may be set to the coordinates of the frontend part, on the conveyor side, of the automatic guided vehicle 1, and the rear coordinates may be set to the backend part, on the conveyor side, of the automatic guided vehicle 1.

Figure 16:
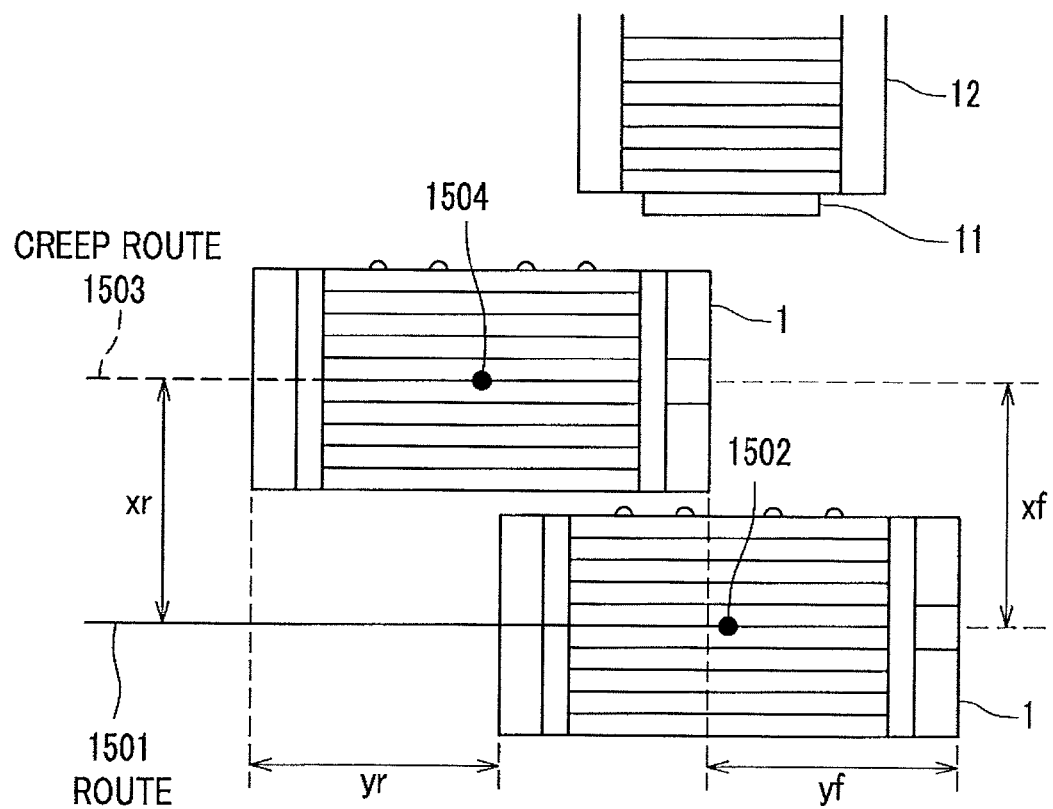
FIG. 16 is a diagram illustrating a method for creating a creep target address and creep route data.

As shown in FIG. 16, the creep drive control section 119 sets the front coordinates of the creep target address 1504 to the coordinates which are moved back by correction values (xf, yf) from the front coordinates, of the automatic guided vehicle 1, taken when the automatic guided vehicle 1 is assumed to have arrived at the target address 1502, and sets the rear coordinates of the creep target address 1504 to the coordinates which are moved back by correction values (xr, yr) from the rear coordinates, of the automatic guided vehicle 1, taken when the automatic guided vehicle 1 is assumed to have arrived at the target address 1502.

Then, the creep drive control section 119 creates data (creep route data) of the route (the creep route 1503) toward the creep target address 1504. The creep route data is created, based on a preset condition (such as to be parallel to the route 1501).

In such a manner, by managing the creep target address 1504 and the creep route 1503 by the front coordinates and the rear coordinates, the automatic guided vehicle 1 can be moved close to the conveyor 12 in the direction along the conveyor 12 even when the conveyor 12 is installed in a state with a deviation from a design.

Figure 17A:
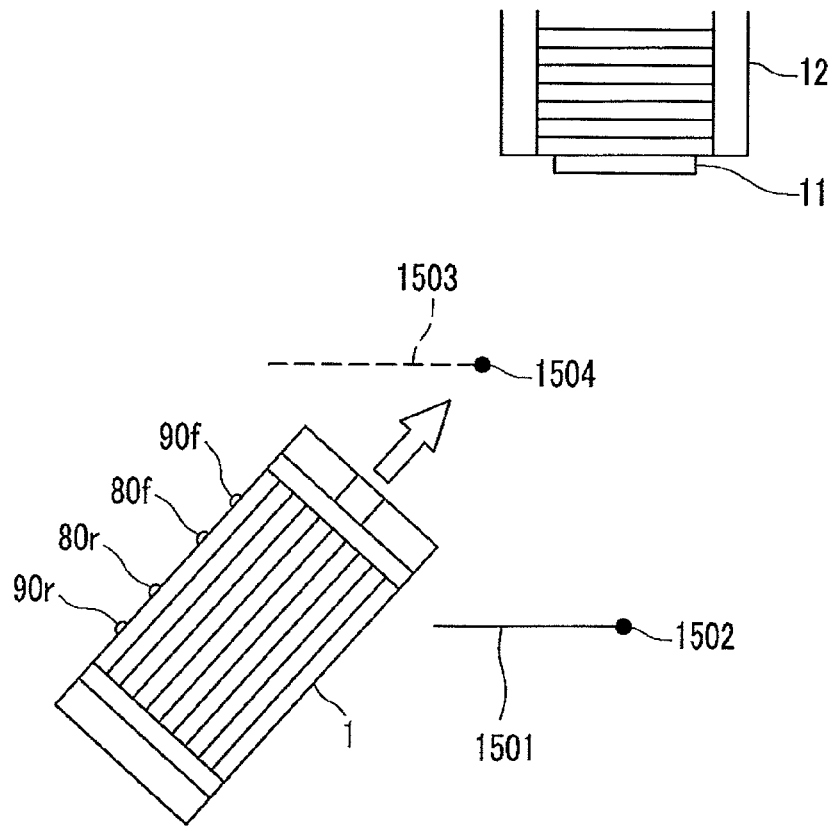
FIGS. 17A and 17B are diagrams schematically illustrating a process for stoppage control according to the present embodiment (No. 2)
Figure 17B:
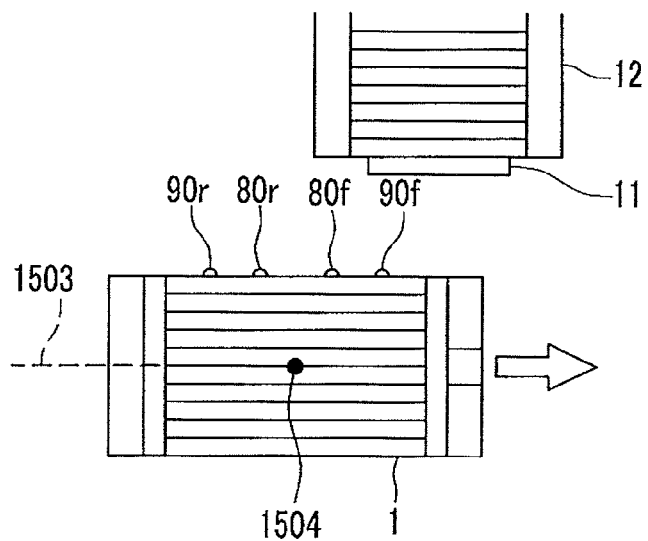

Incidentally, as described above, the creep target address 1504 and the creep route 1503 are managed by the front coordinates and the rear coordinates, however, in the present embodiment, in order to avoid complication, the creep target address 1504 and the creep route 1503, as shown in FIG. 17B are represented in terms of the center position of the automatic guided vehicle 1.

Returning to FIG. 15B, subsequent to creation of the creep target address 1504 and the data (creep route data) of the creep route 1503 (FIG. 15B), the automatic guided vehicle 1 has been set in advance to run on the creep route 1503 in priority to the route 1501. Accordingly, the creep drive control section 119 drives the automatic guided vehicle 1 toward the coordinates of the creep target address 1504 on the creep route 1503 (FIG. 17A).

After a while, when the front coordinates and the rear coordinates of the automatic guided vehicle 1 arrive respectively at the front coordinates and the rear coordinates (FIG. 17B), in other words, when the automatic guided vehicle 1 arrives at 'the start point at the position of starting sensor drive', the sensor drive control section 120 starts a sensor drive control.

Incidentally, the creep drive control drives the automatic guided vehicle 1 while performing position estimation by the laser distance sensor 20 similarly to a normal drive, however, the sensor drive control drives the automatic guided vehicle 1, based on information from the photoelectric sensors 80 and the distance measuring sensors 90 (sensor drive).

In the sensor drive control, first, the sensor drive control section 120 drives the automatic guided vehicle 1 forward, while it is determined whether or not the front photoelectric sensor 80f and the rear photoelectric sensor 80r have detected a reflected light, from the reflecting plate 11, of a signal light projected from themselves.

Figure 18A:
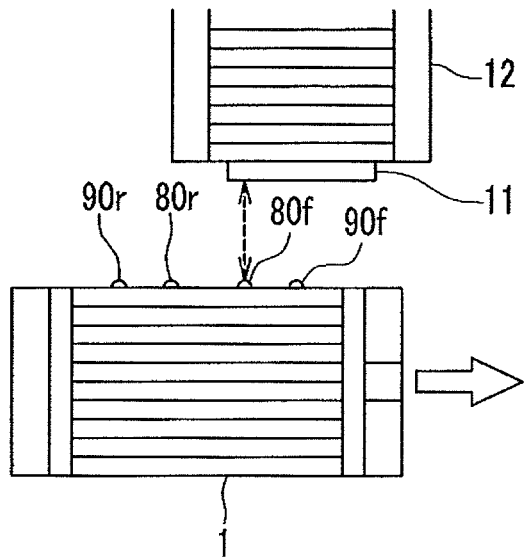
FIGS. 18A and 18B are diagrams schematically illustrating the process for stoppage control according to the present embodiment (No. 3)
Figure 18B:
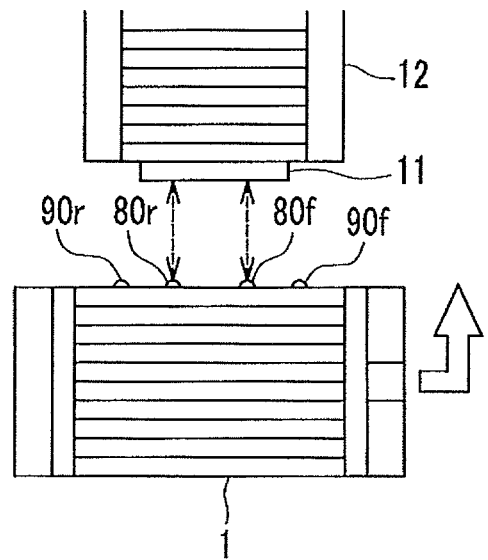

When the front photoelectric sensor 80f has detected a reflected light (FIG. 18A), and further the rear photoelectric sensor 80r has detected a reflected light from the reflecting plate 11, the sensor drive control section 120 controls the steering wheel 40 to turn the automatic guided vehicle 1 toward the conveyor 12 (FIG. 18B).

Figure 19A:
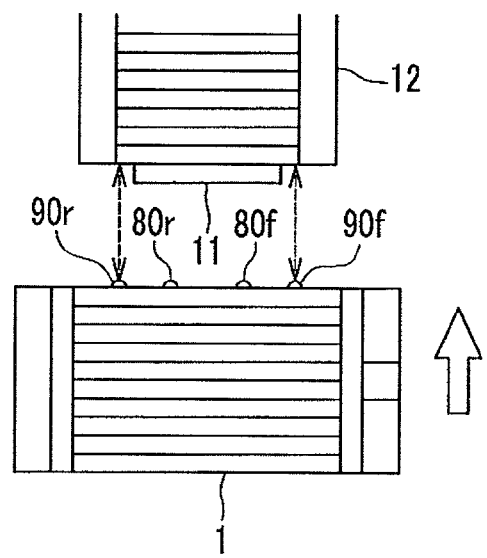
FIGS. 19A and 19B are diagrams schematically illustrating the process for stoppage control according to the present embodiment (No. 4)
Figure 19B:
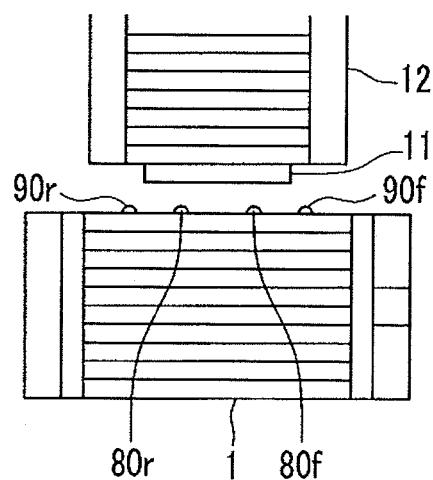

Then, the sensor drive control section 120 laterally moves the automatic guided vehicle 1 toward the conveyor 12, based on distance information detected by the front distance measuring sensor 90f and the rear distance measuring sensor 90r (FIG. 19A), and when the distance detected by the front distance measuring sensor 90f and the rear distance measuring sensor 90r has become within a predetermined value, the sensor drive control section 120 stops the automatic guided vehicle 1 (FIG. 19B).

Incidentally, the automatic guided vehicle 1 laterally moves by steering the steering wheel 40 at a right angle in the phase shown in FIG. 19A, however, the steering wheel 40 may be steered at a certain angle such that the automatic guided vehicle 1 is obliquely driven to approach the conveyor 12.

In the preset embodiment, the sensor drive control is performed, using the photoelectric sensors 80 and the distance measuring sensors 90, however, without being limited thereto, the sensor drive control may be performed using the self-position estimating function of the laser distance sensor 20, as described above. In this case, the sensor drive control section 120 controls the automatic guided vehicle 1 such that the distance between the position of the automatic guided vehicle 1 itself and the conveyor 12 detected by the laser distance sensor 20 becomes within a predetermined value.

Process for Creep Drive Control

Then, a process for creep drive control and a process for sensor drive control will be described in detail, based on FIGS. 20 and 21 and referring to FIG. 3.

Figure 20:
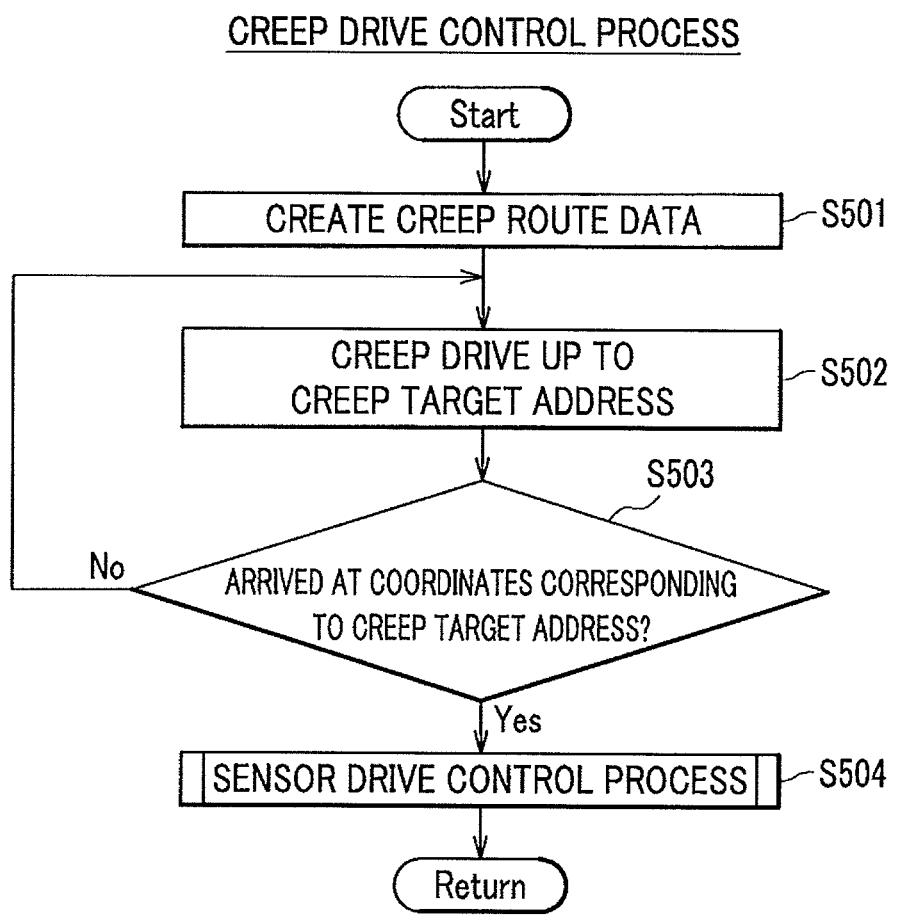
FIG. 20 is a flowchart showing a procedure of a process for creep drive control according to the present embodiment.

FIG. 20 is a flowchart showing a procedure for creep drive control according to the present invention.

First, the creep drive control section 119 creates route data (creep route data) for creep drive (S501: FIG. 15B). The creep route data is assumed to include the coordinates of a creep target address. Incidentally, a method for creating a creep target address and creep route data has been described above with reference to FIG. 16, description will be omitted here.

Then, the creep drive control section 119 creep-drives the automatic guided vehicle 1 to the creep target address (S502: FIG. 17A). That is, the creep drive control section 119 performs drive control, giving the creep route data a priority over the route data 133. Incidentally, the process in step S502 is similar to the process in steps S404 to S412 in FIG. 12 except that the automatic guided vehicle 1 is driven on the creep route.

Then, the creep drive control section 119 determines whether or not the automatic guided vehicle 1 has arrived at the coordinates that correspond to the creep target address (S503). That is, the creep drive control section 119 determines whether or not the front coordinates and the rear coordinates of the automatic guided vehicle 1 have agreed with the front coordinates and the rear coordinates of the creep target address. Accurately, the creep drive control section 119 determines whether or not the automatic guided vehicle 1 has moved by the movement distance, as described above, of the creep drive.

As a result of step S503, if the automatic guided vehicle 1 has not yet arrived at the coordinates that correspond to the creep target address (S503→No), the creep drive control section 119 returns the process to step S502.

As a result of step S503, if the automatic guided vehicle 1 has arrived at the coordinates that correspond to the creep target address (S503→Yes: FIG. 17B), the sensor drive control section 120 stats the sensor drive control process in FIG. 21 (S504).

Sensor Drive Control

Figure 21:
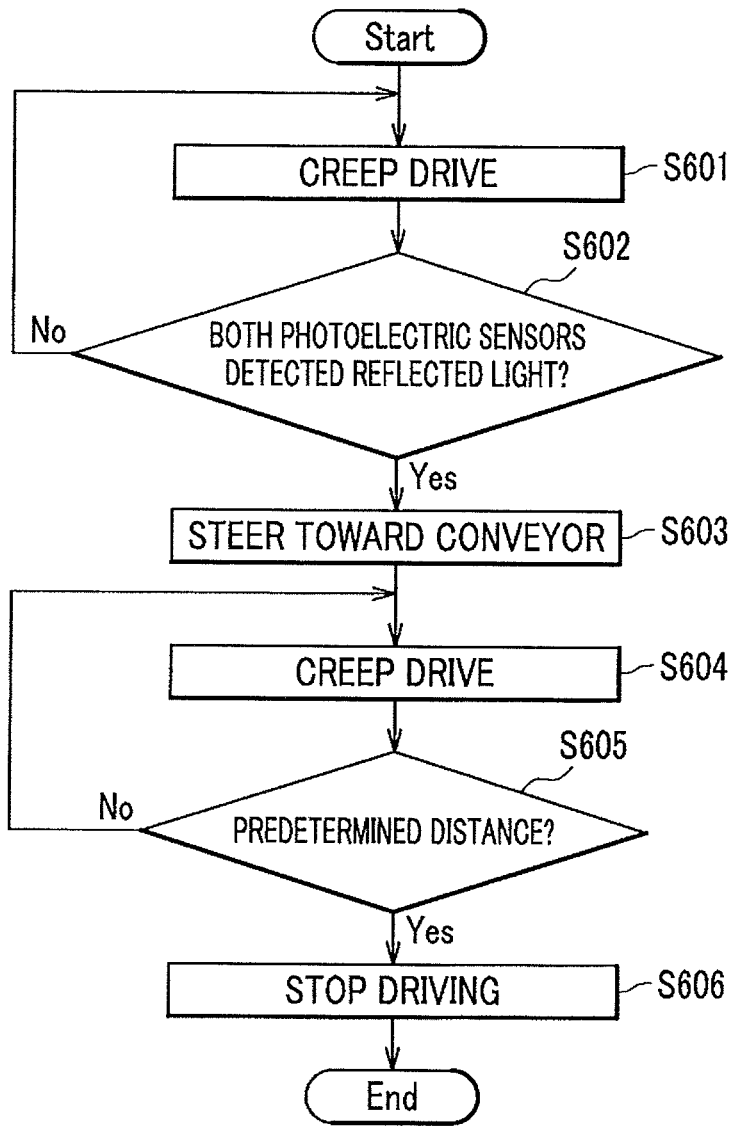
FIG. 21 a flowchart showing a procedure of a process for sensor drive control according to the present embodiment.

FIG. 21 is a flowchart showing the procedure of the sensor drive control process according to the present embodiment.

First, the sensor drive control section 120 creep-drives the automatic guided vehicle 1 forward (S601: FIG. 18A). This drive is performed without using measurement data 131 by the laser distance sensor 20 (However, distance measurement by the laser distance sensor 20 may be performed).

Then, the sensor drive control section 120 determines whether or not both the photoelectric sensors 80, namely the photoelectric sensor 80f and the photoelectric sensor 80r, have detected a reflected light, from the reflecting plate 11, of a signal light projected from themselves (S602).

As a result of step S602, if both the photoelectric sensors 80 have not detected a reflected light from the reflecting plate 11 (S602→No), the sensor drive control section 120 returns the process to step S601.

As a result of step S602, if the photoelectric sensors 80 have detected a reflected light from the reflecting plate 11 (S602→Yes), the sensor drive control section 120 steers the steering wheel 40 toward the conveyor 12 (S603: FIG. 18B). The process in step S603 is performed without stopping the automatic guided vehicle 1.

Then, the sensor drive control section 120 creep-drives the automatic guided vehicle 1, laterally driving the automatic guided vehicle 1 toward the conveyor 12 (S604: FIG. 19A).

Then, the sensor drive control section 120 determines whether or not a distance obtained from the distance measuring sensor 90f and the distance measuring sensor 90r has become a predetermined distance (S605).

As a result of step S605, if the distance obtained from at least one of the distance measuring sensors 90 has not become the predetermined distance (S605→No), the sensor drive control section 120 returns the process to step S604. In this situation, if one of the distance measuring sensors 90 has detected a distance within a predetermined distance while the other distance measuring sensor 90 has detected a distance out of the predetermined distance, the sensor drive control section 120 stops the running wheel 50 on the side of the distance measuring sensor 90 having detected the distance within the predetermined distance, and control the steering of the steering wheel 40 so that the distance measuring sensor 90 having detected the distance out of the predetermined distance approaches the conveyor 12.

As a result of step S605, if the distances obtained from both the distance measuring sensors 90 have become within the predetermined distance (S605→Yes), the sensor drive control section 120 stops the drive (S606: FIG. 19B).

Incidentally, regarding step S603, it is assumed, in the present embodiment, that the steering wheel 40 is steered immediately after the rear photoelectric sensor 80r has detected a reflected light, however, the steering wheel 40 may be steered after the automatic guided vehicle 1 is driven by a predetermined distance from when the rear photoelectric sensor 80r has detected the reflected light.

Sensor Drive Control in Case Vehicle is in an Oblique Direction

FIGS. 22A to 23B are diagrams showing an example of sensor drive control in a case that the automatic guided vehicle obliquely approaches the conveyor. Incidentally, the process shown in FIGS. 22 and 23 also can be carried out with the algorithm shown in FIG. 20.

Figure 22A:
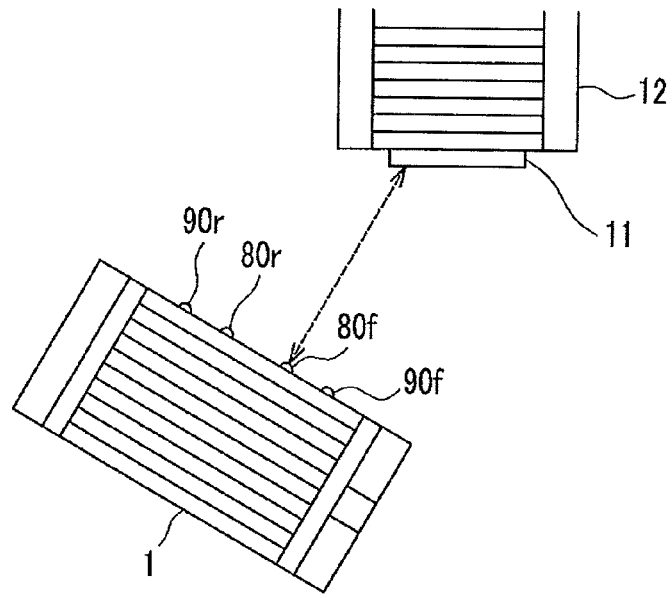
FIGS. 22A and 22B are diagrams showing an example of sensor drive control in a case that the automatic guided vehicle obliquely approaches a conveyor (No. 1)
Figure 22B:
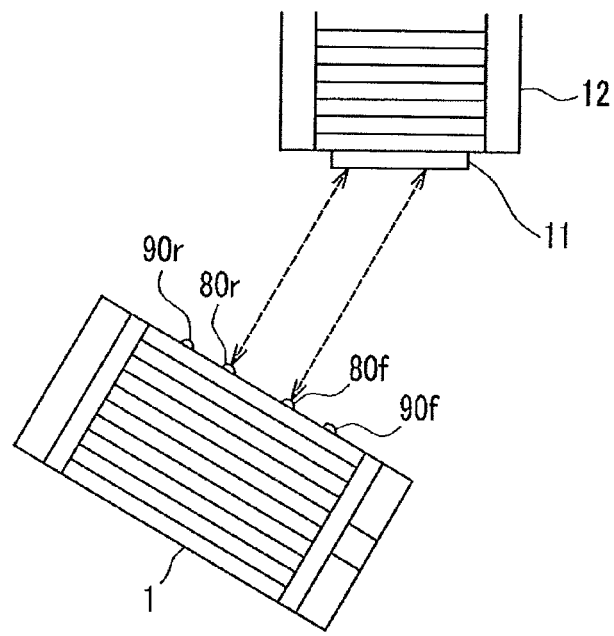

First, while creep-running forward, the sensor drive control section 120 obtains detection of a reflected light by the front photoelectric sensor 80f (FIG. 22A), and then creep-runs further forward, thereby obtaining detection of a reflected light by the rear 80r (FIG. 22B). Incidentally, the reflecting plate 11 has a structure similar to that of a photo-reflecting piece for a guard rail, and can reflect an incident light, the incident light having entered from an oblique direction, into the incident direction.

When both the photoelectric sensors 80 have detected a reflected light, the sensor drive control section 120 laterally drives the automatic guided vehicle 1, based on distance information by the distance measuring sensor 90.

Figure 23A:
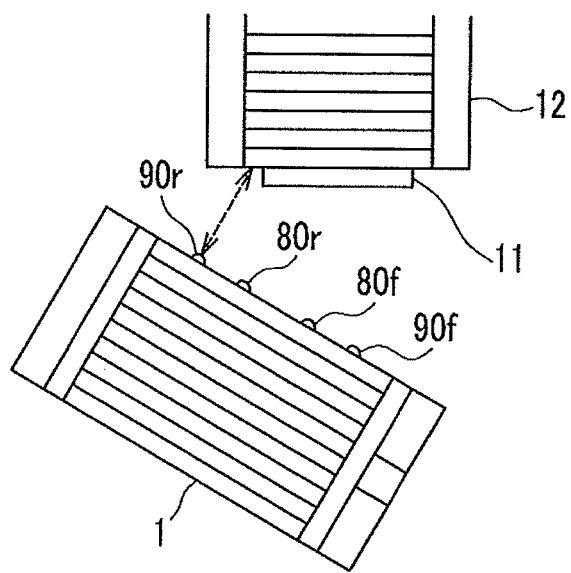
FIGS. 23A and 23B are diagrams showing the example of sensor drive control in the case that the automatic guided vehicle oblique approaches a conveyor (No. 2)

For example, as shown in FIG. 23A, even when the distance by the rear distance measuring sensor 90r has become within the predetermined distance, if the distance by the front distance measuring sensor 90 has not yet become within the predetermined distance, the sensor drive control section 120 stops the rear running wheels 50, drives only the front running wheels 50 while steering the steering wheel 40, and thereby the front distance measuring sensor 90*f* approaches the conveyor 12.

Figure 23B:
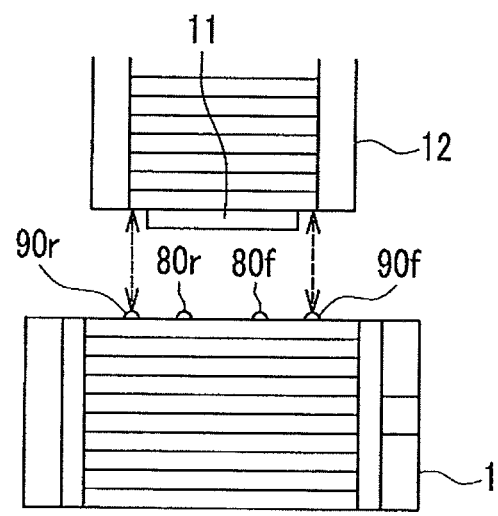

After a while, when the distance detected by the front distance measuring sensor 90*f* also has become within the predetermined distance, the sensor drive control section 120 stops the automatic guided vehicle 1 (FIG. 23B).

In such a manner, even when the automatic guided vehicle 1 located at the creep target address 1504 (FIG. 16) is along an oblique direction with respect to the conveyor 12, the automatic guided vehicle 1 can be accurately set alongside the conveyor 12.

In FIGS. 22A to 23B, a case that the automatic guided vehicle 1 obliquely approaches the conveyor 12 is illustrated. However, in reverse, also in a case that the conveyor 12 is obliquely arranged, the automatic guided vehicle 1 can be set alongside the conveyor 12 in a process similar to the process in FIGS. 22A to 23B.

By such an arrangement, for example, even when the position of the conveyor 12 is deviated after setting correction values as shown in FIG. 16, the automatic guided vehicle 1 can be accurately set alongside the conveyor 12.

Figure 24A:
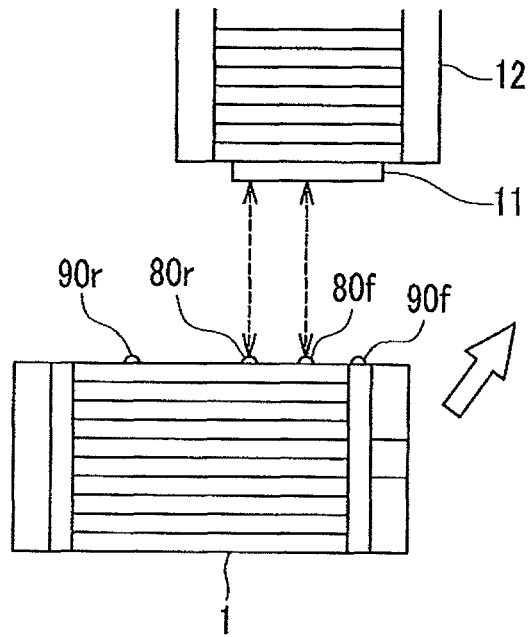
FIGS. 24A and 24B are diagrams illustrating another example of the present embodiment.
Figure 24B:
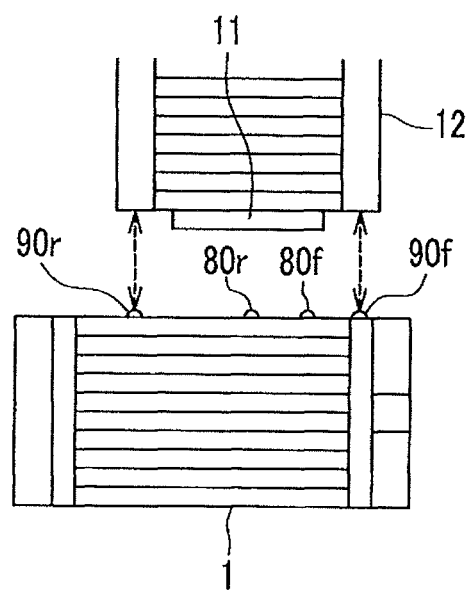

FIGS. 24A and 24B are diagrams for illustration of another example in the present embodiment.

As shown in FIG. 24A, the rear photoelectric sensor 80*r* is arranged closer to the front photoelectric sensor 80*f*, and thus the distance between the front photoelectric sensor 80*f* and the rear photoelectric sensor 80*r* is shortened. When both the photoelectric sensors 80*f* and 80*r* have detected a reflected light from the reflecting plate 11, the automatic guided vehicle 1 may be obliquely driven so that the automatic guided vehicle 1 is set alongside the conveyor 12, as shown in FIG. 24B.

Incidentally, in the present embodiment, when the automatic guided vehicle 1 has arrived at the start point of creep drive control, the automatic guided vehicle 1 creates a creep target address 1504 and a creep route 1503, performs the creep drive control toward the creep target address 1504, and performs sensor drive control after arriving at the creep target address 1504 (after arriving at the start point as the position of starting the sensor drive). However, without being limited thereto, it is also possible to set a creep target address 1504 (the start point as the position of starting the sensor drive) in advance at a position before the target address on the route by the route data 133.

Further, an address is transformed into coordinates in the present embodiment, however, without being limited thereto, drive control of the automatic guided vehicle 1 may be performed only with coordinate information.

CONCLUSION

According to the present embodiment, as a target address is managed with coordinates, while enabling address designation that has been performed by drive control with hardware, such as an electric cable or a reflecting tape, it is possible to make the automatic guided vehicle 1 autonomously run without using an electric cable, a reflecting tape, or the like, and further, it is possible to set the automatic guided vehicle 1 alongside the conveyor 12 with a high accuracy.

Further, by making the automatic guided vehicle 1 run to a creep target address that is managed with the front coordinates and the rear coordinates and performing a fine adjustment with sensor drive control, the automatic guided vehicle 1 can be quickly set alongside the conveyor 12.

Still further, even when the conveyor 12 is arranged in a deviated or bent state, by managing a creep target address with the front coordinates and the rear coordinates, it is possible to perform sensor drive control of the automatic guided vehicle 1 after making the automatic guided vehicle 1 into a state of being along the conveyor 12, and thereby quickly set the automatic guided vehicle 1 alongside the conveyor 12.

Yet further, by computing the steering angle θ and controlling the steering wheel 40 at the steering angle θ, the automatic guided vehicle 1 can return onto the route.

According to the invention, it is possible to provide an automatic guided vehicle and a method for drive control of the same, wherein the automatic guided vehicle can be set alongside a precise conveyor (approach to an object) in stopping at a task address (approach to the object).

What is claimed is:

1. An automatic guided vehicle that approaches an object by performing route data driving when the vehicle is distant from the object, the route data driving being driving on a preset route based on preset route data, and then switches to sensor driving, the sensor driving being based on a sensor thereof, the vehicle comprising:

a control section that includes a creep drive control section to perform creep driving, which is route data driving at a creep velocity, and a sensor drive control section to perform the sensor driving, wherein the creep drive control section:

decelerates the automatic guided vehicle to the creep velocity when the vehicle approaches a predetermined target address of creep drive control, determines whether points of a pair of predetermined points on the vehicle have approached predetermined start points of sensor drive control or not, and switches the route data driving over to the sensor driving by using the sensor drive control section when the creep drive control section determines that the pair of predetermined points on the vehicle have matched the pair of predetermined start points of sensor drive control, and wherein the sensor drive control section:

makes the automatic guided vehicle further approach the object by using a photoelectric sensor pair after switching the route data driving over to the sensor driving, and makes the automatic guided vehicle further approach the object by using a distance measure sensor pair after determining a light from the object by the photoelectric sensor pair.

2. The automatic guided vehicle according to claim 1, comprising:

a laser distance sensor for measuring distances to surroundings by scanning with laser light, wherein the control section performs the route data driving with the laser distance sensor, wherein the photoelectric sensor pair includes:

a photo-detection sensor that projects a signal light to a reflecting plate arranged on the object, receives a reflected light from the reflecting plate, and thereby detects a presence of the object; and wherein the distance measure sensor pair includes:

a distance measuring sensor capable of measuring a distance to the object, and wherein the control section performs the sensor driving with the photo-detection sensor and the distance measuring sensor.

3. The automatic guided vehicle according to claim 2, wherein distance measuring sensors are arranged at each of a front portion and a rear portion of a side surface of the automatic guided vehicle, and wherein when the distance to the object measured by one of the distance measuring sensors is within a predetermined distance and the distance to the object measured by the other one of the distance measuring sensors is out of the predetermined distance, the control section controls the automatic guided vehicle such that the distance measuring sensor whose distance to the object is out of the predetermined distance approaches the object.

4. The automatic guided vehicle according to claim 1, comprising:
a laser distance sensor for measuring distances to surroundings by scanning with laser light,
wherein the control section performs the route data driving with the laser distance sensor, and performs the sensor driving with the laser distance sensor as the sensor for the sensor driving.

5. The automatic guided vehicle according to claim 1, wherein the control section creates a start position to start approaching the object during sensor driving, at a position that is closer to the object than any position on a route by the route data.

6. The automatic guided vehicle according to claim 2, wherein the control section creates a start position to start approaching the object during sensor driving, at a position that is closer to the object than any position on a route set by the route data.

7. The automatic guided vehicle according to claim 3, wherein the control section creates a start position to start approaching the object during sensor driving, at a position that is closer to the object than any position on a route set by the route data.

8. The automatic guided vehicle according to claim 4, wherein the control section creates a start position to start approaching the object during sensor driving, at a position that is closer to the object than any position on a route set by the route data.

9. The automatic guided vehicle according to claim 5, wherein the control section includes a first sensor pair having sensors spaced apart at a distance which is less than a width of the object, and a second sensor pair having second sensors spaced apart at a distance which is less than a width of a reference indicator provided on the object, where the first sensor pair is used to determine whether or not first predetermined multiple positions have been concurrently obtained by the vehicle with respect to the object, and where the second sensor pair is used to determine whether or not second predetermined multiple positions have been concurrently obtained by the vehicle with respect to the reference indicator provided on the object, one set of the first predetermined multiple positions and the second predetermined multiple positions jointly representing a start position to start the sensor driving, where the first sensor pair and the second sensor pair are differing types of sensors from each other, one set of the first predetermined multiple positions and the second predetermined multiple positions jointly representing a start position to start approaching the object, and wherein the first and/or second predetermined multiple positions are more particularly a predetermined first position having been obtained by a first portion of the vehicle, and a second predetermined second position having been obtained by a second portion of the vehicle.

10. The automatic guided vehicle according to claim 6, wherein the control section includes a first sensor pair having sensors spaced apart at a distance which is less than a width of the object, and a second sensor pair having second sensors spaced apart at a distance which is less than a width of a reference indicator provided on the object, where the first sensor pair is used to determine whether or not first predetermined multiple positions have been concurrently obtained by the vehicle with respect to the object, and where the second sensor pair is used to determine whether or not second predetermined multiple positions have been concurrently obtained by the vehicle with respect to the reference indicator provided on the object, one set of the first predetermined multiple positions and the second predetermined multiple positions jointly representing a start position to start the sensor driving, where the first sensor pair and the second sensor pair are differing types of sensors from each other, one set of the first predetermined multiple positions and the second predetermined multiple positions jointly representing a start position to start approaching the object, and wherein the first and/or second predetermined multiple positions are more particularly a predetermined first position having been obtained by a first portion of the vehicle, and a second predetermined second position having been obtained by a second portion of the vehicle.

11. The automatic guided vehicle according to claim 7, wherein the control section includes a first sensor pair having sensors spaced apart at a distance which is less than a width of the object, and a second sensor pair having second sensors spaced apart at a distance which is less than a width of a reference indicator provided on the object, where the first sensor pair is used to determine whether or not first predetermined multiple positions have been concurrently obtained by the vehicle with respect to the object, and where the second sensor pair is used to determine whether or not second predetermined multiple positions have been concurrently obtained by the vehicle with resect to the reference indicator provided on the object, one set of the first predetermined multiple positions and the second predetermined multiple positions jointly representing a start position to start the sensor driving, where the first sensor pair and the second sensor pair are differing types of sensors from each other, one set of the first predetermined multiple positions and the second predetermined multiple positions jointly representing a start position to start approaching the object, and wherein the first and/or second predetermined multiple positions are more particularly a predetermined first position having been obtained by a first portion of the vehicle, and a second predetermined second position having been obtained by a second portion of the vehicle.

12. The automatic guided vehicle according to claim 8, wherein the control section includes a first sensor pair having sensors spaced apart at a distance which is less than a width of the object, and a second sensor pair having second sensors spaced apart at a distance which is less than a width of a reference indicator provided on the object, where the first sensor pair is used to determine whether or not first predetermined multiple positions have been concurrently obtained by the vehicle with respect to the object, and where the second sensor pair is used to determine whether or not second predetermined multiple positions have been concurrently obtained by the vehicle with respect to the reference indicator provided on the object, one set of the first predetermined multiple positions and the second predetermined multiple positions jointly representing a start position to start the sensor driving, where the first sensor pair and the second sensor pair are differing types of sensors from each other, one set of the first predetermined multiple positions and the second predetermined multiple positions jointly representing a start position to start approaching the object, and wherein the first and/or second predetermined multiple positions are more particularly a predetermined first position having been obtained by a first portion of the vehicle, and a second predetermined second position having been obtained by a second portion of the vehicle.

13. A method for drive control of an automatic guided vehicle that has a distance measure sensor pair and a photoelectric sensor pair, the method comprising:
when the vehicle is distant from an object, performing route data driving that is driving on a preset route based on preset route data; and
when the vehicle approaches the object, starting sensor driving that is based on a sensor thereof, to make the vehicle further approach the object,
wherein the automatic guided vehicle:
decelerates the automatic guided vehicle to a creep velocity when the vehicle approaches a predetermined target address of creep drive control,
determines whether or not
a pair of predetermined points on the vehicle have matched a pair of predetermined start points of sensor driving, and
switches the route data driving over to the sensor driving when the pair of predetermined points on the vehicle have matched the pair of predetermined start points of sensor driving,
further approach the object by using the photoelectric sensor pair after switching the route data driving over to the sensor driving, and
further approach the object by using the distance measure sensor pair after detecting a light from the object by the photoelectric sensor pair.

14. The method for drive control according to claim 13, wherein the automatic guided vehicle comprises:
a laser distance sensor for measuring distances to surroundings by scanning with laser light,
wherein the photoelectric sensor pair includes:
a photo-detection sensor that projects a signal light to a reflecting plate arranged on the object, receives a reflected light from the reflecting plate, and thereby detects a presence of the object; and
wherein the distance measure sensor pair includes:
a distance measuring sensor capable of measuring a distance to the object,
and wherein the automatic guided vehicle:
performs the route data driving with the laser distance sensor up to a start position to start the sensor driving; and
performs the sensor driving with the photo-detection sensor and the distance measuring sensor from the start position.

15. The method for drive control according to claim 13, wherein the automatic guided vehicle comprises:
a laser distance sensor for measuring distances to surroundings by scanning with laser light,
and wherein the automatic guided vehicle:
performs the route data driving with the laser distance sensor up to a start position to start the sensor driving; and
performs the sensor driving with the laser distance sensor after the start position.

16. The method for drive control according to claim 13, wherein the automatic guided vehicle creates the start position to start the sensor driving, at a position that is closer to the object than any position on a route set by the route data.

17. The method for drive control according to claim 14, wherein the automatic guided vehicle creates the start position to start the sensor driving, at a position that is closer to the object than any position on a route set by the route data.

18. The method for drive control according to claim 15, wherein the automatic guided vehicle creates the start position to start the sensor driving, at a position that is closer to the object than any position on a route set by the route data.

19. The method for drive control according to claim 13, wherein the photoelectric sensor pair include a first sensor pair having sensors spaced apart at a distance which is less than a width of the object, and the distance measure sensor pair includes a second sensor pair having second sensors spaced apart at a distance which is less than a width of a reference indicator provided on the object, where the first sensor pair is used to determine whether or not first predetermined multiple position have been concurrently obtained by the vehicle with respect to the object, and where the second sensor pair is used to determine whether or not second redetermined multiple positions have been concurrently obtained by the vehicle with respect to the reference indicator provided on the object, one set of the first predetermined multiple positions and the second predetermined multiple positions jointly representing a start position to start the sensor driving, where the first sensor pair and the second sensor pair are differing types of sensors from each other, one set of the first predetermined multiple positions and the second predetermined multiple positions jointly representing a start position to start approaching the object, and wherein the first predetermined multiple positions and/or the second predetermined multiple positions are more particularly a predetermined first position having been obtained by a first portion of the vehicle, and a second predetermined second position having been obtained by a second portion of the vehicle.

* * * * *